United States Patent
Matsumoto et al.

(10) Patent No.: US 7,636,121 B2
(45) Date of Patent: Dec. 22, 2009

(54) RECORDING AND REPRODUCING DEVICE

(75) Inventors: Ryota Matsumoto, Tokyo (JP); Asako Kawamura, Tokyo (JP)

(73) Assignee: Sony Corporation, Tokyo (JP)

( * ) Notice: Subject to any disclaimer, the term of this patent is extended or adjusted under 35 U.S.C. 154(b) by 713 days.

(21) Appl. No.: 11/205,040

(22) Filed: Aug. 17, 2005

(65) Prior Publication Data

US 2006/0044445 A1 Mar. 2, 2006

(30) Foreign Application Priority Data

Aug. 31, 2004 (JP) ............................ P2004-253429

(51) Int. Cl.
*H04N 5/222* (2006.01)
*G03B 17/00* (2006.01)
(52) U.S. Cl. .................. 348/333.06; 348/373; 348/376; 386/107; D16/200; 396/419; 396/428; 396/429; 396/535
(58) Field of Classification Search ................ 348/151, 348/333.06, 333.07, 373, 376; D16/208, D16/211, 212, 218–220, 229; 396/419, 428, 396/535; 386/46, 107
See application file for complete search history.

(56) References Cited

U.S. PATENT DOCUMENTS

| | | | | |
|---|---|---|---|---|
| 5,742,341 A | * | 4/1998 | Ohishi et al. ................. | 348/373 |
| 6,115,068 A | * | 9/2000 | Ariga et al. .................. | 348/373 |
| 6,457,027 B1 | | 9/2002 | Orr | |
| 6,483,542 B1 | * | 11/2002 | Morinaga ............... | 348/333.06 |
| 2003/0008679 A1 | | 1/2003 | Iwata et al. | |
| 2005/0020325 A1 | * | 1/2005 | Enger et al. .............. | 455/575.3 |

FOREIGN PATENT DOCUMENTS

| | | |
|---|---|---|
| EP | 0 802 688 A3 | 5/1999 |
| EP | 1 028 583 A1 | 8/2000 |
| EP | 1 298 909 A1 | 4/2003 |
| EP | 1 347 455 A3 | 9/2003 |
| EP | 1 414 220 A3 | 5/2004 |
| FR | 2 811 133 A1 | 1/2002 |
| GB | 2 342 802 A | 4/2000 |
| JP | 10-042014 | 2/1998 |
| JP | 11-187292 | 7/1999 |
| JP | 2000-078254 | 3/2000 |
| JP | 2003-204383 | 7/2002 |
| JP | 2003-032622 | 1/2003 |
| WO | WO 03/046705 A3 | 6/2003 |

OTHER PUBLICATIONS

British Search Report dated Oct. 28, 2005.

* cited by examiner

*Primary Examiner*—Thai Tran
*Assistant Examiner*—Mishawn Dunn
(74) *Attorney, Agent, or Firm*—Finnegan, Henderson, Farabow, Garrett & Dunner, L.L.P.

(57) ABSTRACT

When the monitor is slid to the inner side of the device main body, a portion of the monitor is faced outside of the device main body, and various pieces of information are display in one portion of the area, and when the monitor is slid outside of the device main body, the whole area of the monitor is faced outside of the device main body, and various pieces of information are displayed in the whole area.

1 Claim, 18 Drawing Sheets

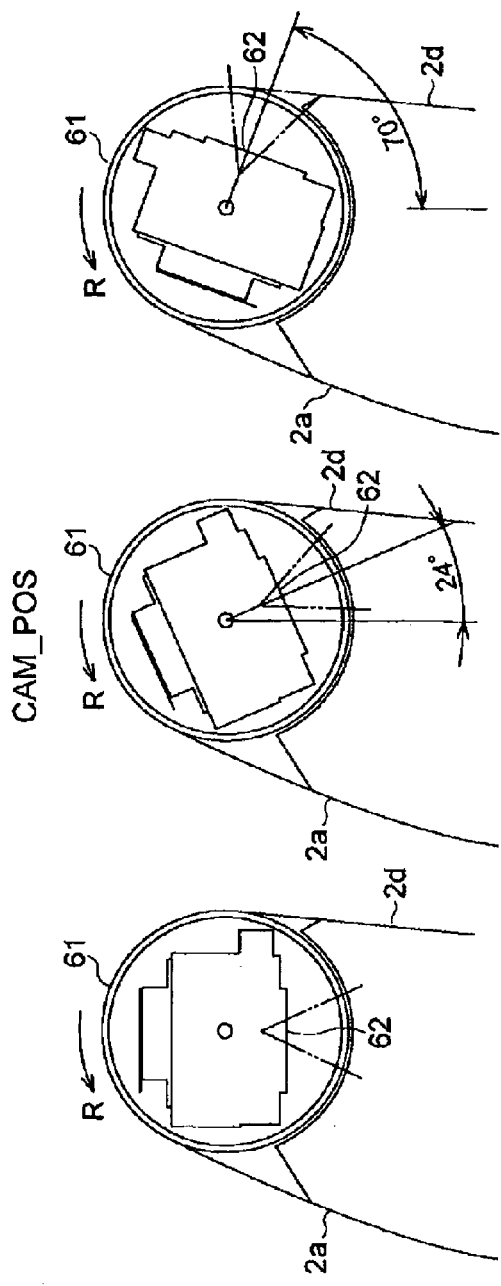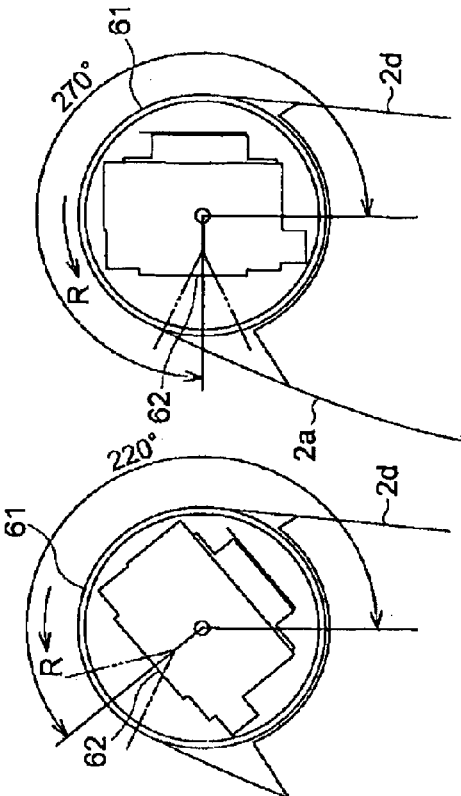

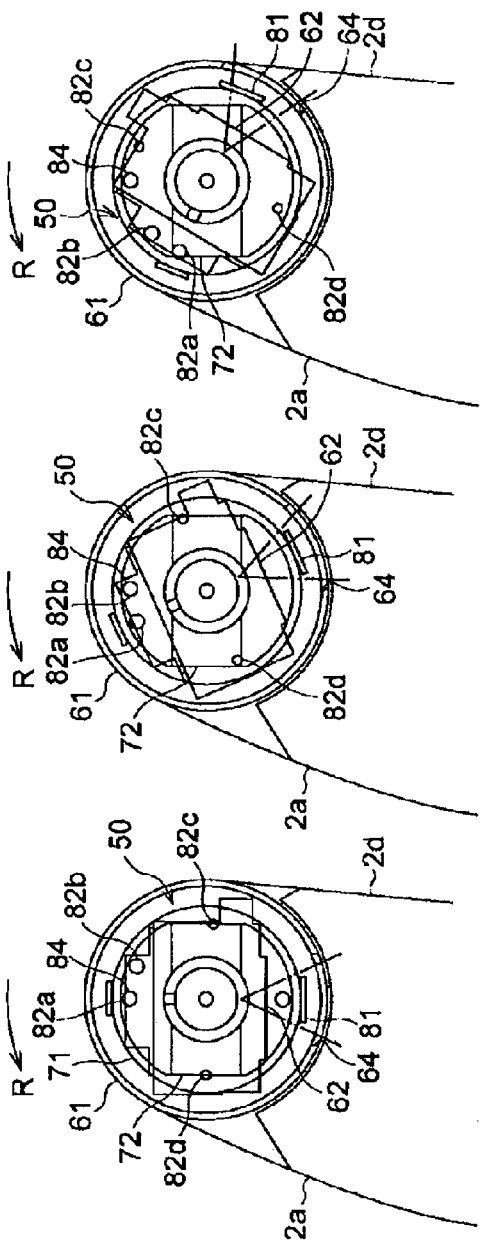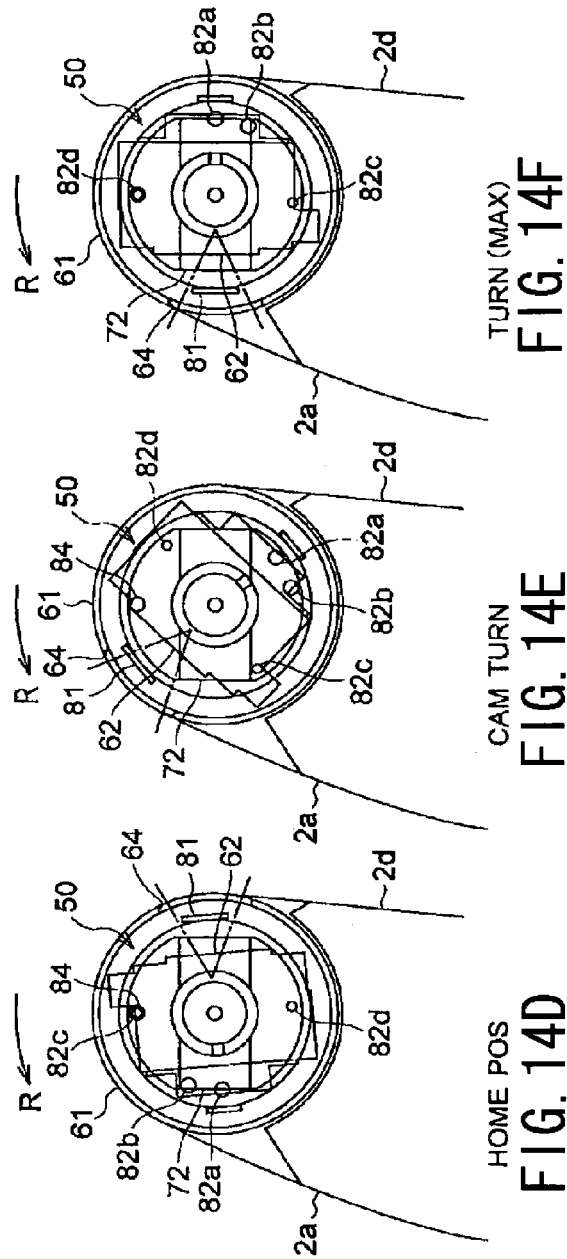

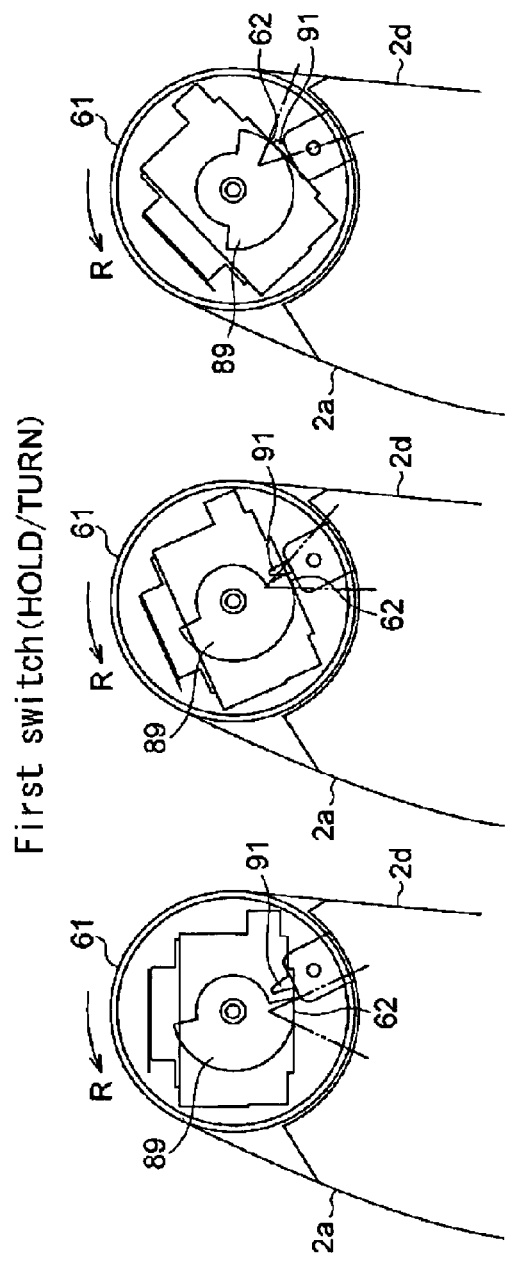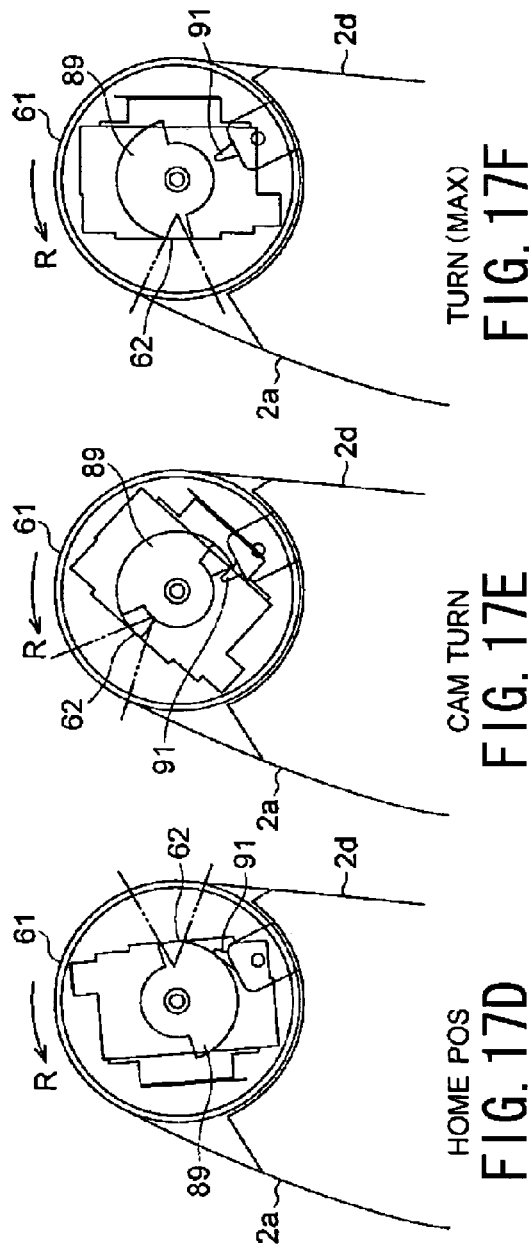

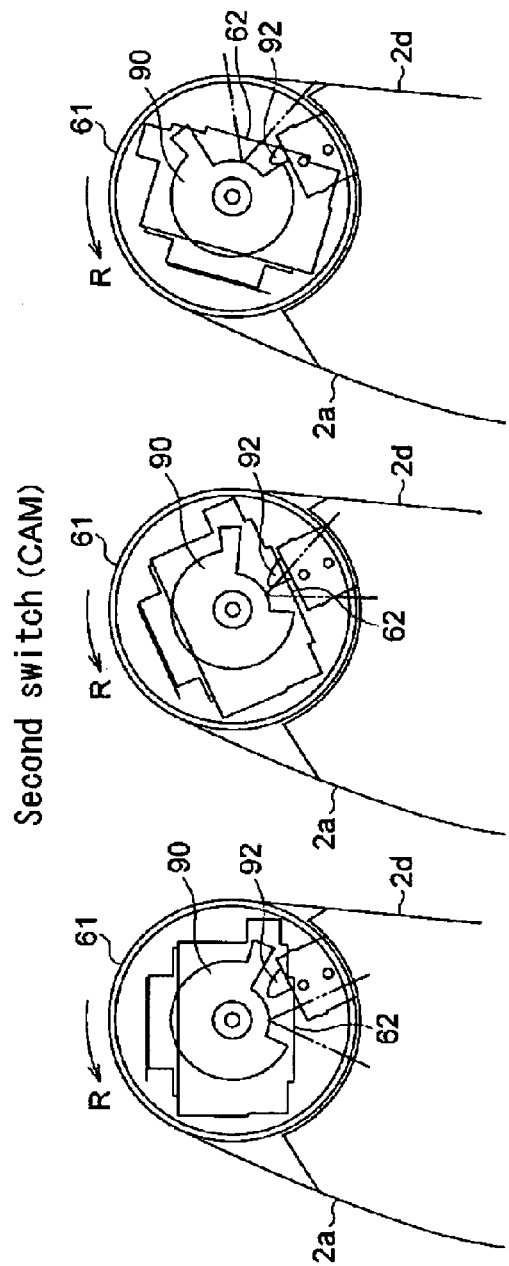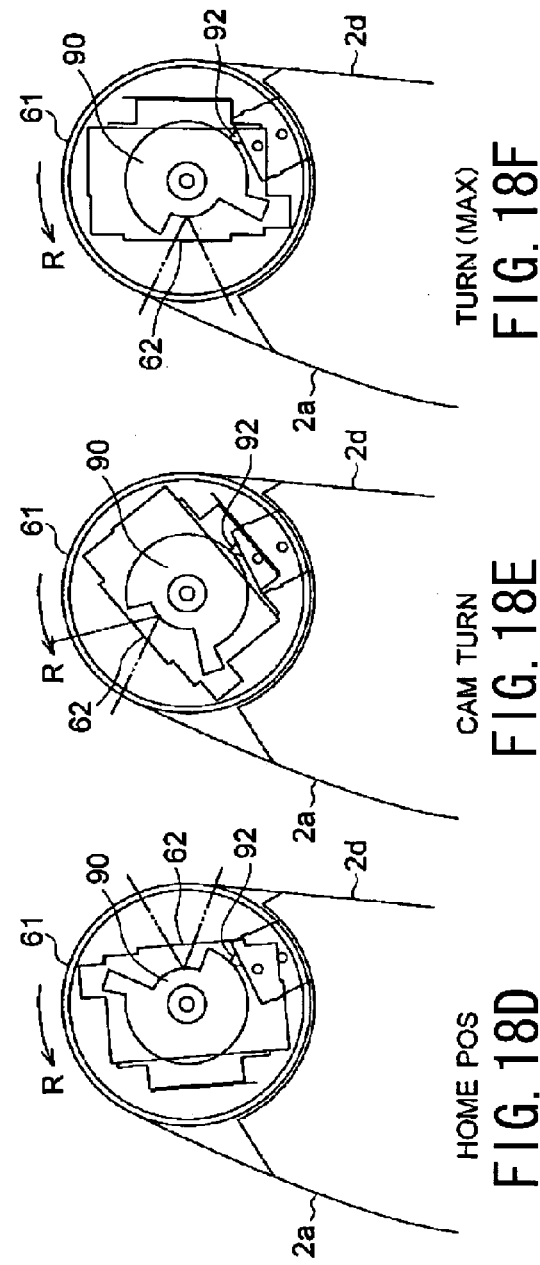

RECORDING AND REPRODUCING DEVICE

CROSS REFERENCE TO RELATED APPLICATIONS

The present invention contains subject matter related to Japanese Patent Application JP2004-253429 filed in the Japanese Patent Office on Aug. 31, 2004, the entire contents of which being incorporated herein by reference.

BACKGROUND OF THE INVENTION

1. Field of the Invention

The present invention relates to a recording and reproducing device stored with a recording medium and capable of recording and reproducing audio information, and more in particular, it relates to a recording and reproducing device capable of recording and reproducing image information in addition to audio information.

2. Description of the Related Art

In general, a portable IC recorder has been widely used, which has a built-in recording medium such as a semiconductor memory and the like and is capable of recording and reproducing audio information. In such an IC recorder, while a recording amount continues to increase, accompanied with the increase of recorded audio information, it has become difficult to grasp the content of the recorded audio information, and the reproduction of necessary audio information has become a difficult task. Further, to rapidly reproduce necessary audio information, a user has been compelled to take a note of audio information separately recorded and input a file name and the like into the recorded audio information.

To solve such problems, if an image capture lens for capturing an image and a monitor for displaying the image captured by this image capture lens could be provided for the IC recorder, and if a so-called book marker function taken as an earmark of the recorded audio information by capturing and recording the image at the recording time of the audio information could be provided, usability would be enhanced, and convenience would be provided. It is conceivable that this monitor is allowed to display the recording time of audio information at the recording time, a remaining recordable amount of audio information, and various pieces of information on time and the like in addition to an image captured by the image capture lens, and also to display information on the number of images to be captured and the like.

Further, in the IC recorder having a camera section including the lens and the monitor of this type, when audio information only is recorded or when this IC recorder is not used, it is desirable that the camera section is stored within a device main body so as to protect the monitor and also to make a size of the entire device smaller at the carrying time.

Here, for example, through operation of a selector button and the like, it is possible to switch over various pieces of information such as recording time of audio information, a remaining recordable amount of audio information, image information, and the like which are displayed in the monitor. However, for example, in case image information relative to the audio information is captured at the recording time of the audio information, in addition to the operation of the camera section, the operation of the selector button and the like to switch over the display of the monitor section to the image capture information takes a lot of trouble, and lacks operability and convenience. Please refer to Japanese Patent Laid-Open No. 11-187292.

SUMMARY OF THE INVENTION

The present invention provides a recording and reproducing device in which the display area and content of the monitor change in association with sliding operation of the monitor section.

According to an embodiment of the present invention, there is provided a recording and reproducing device, including: a device main body formed approximately in the shape of a rectangle; an input portion to be inputted with audio information; an output portion for outputting recorded audio information; an image capture portion capturing an image information, having an image capture lens and an image sensor; a monitor slidably provided along the longitudinal direction of the device main body and displaying various pieces of information, a rotation support member including a guide groove formed along the longitudinal direction of the device main body and slidably engaging the monitor, and an urging member for urging the monitor to one end side of the longitudinal direction of the device main body or the other end side according to the slide position of the monitor engaged in the guide groove, wherein, when the monitor is slid to the inner side of the device main body, a portion of the monitor is faced outside of the device main body, and various pieces of information are displayed in one portion of the area, and when the monitor is slid outside of the device main body, the whole area of the monitor is faced outside of the device main body, and various pieces of information are displayed in the whole area.

According to the recording and reproducing device according to an embodiment of the present invention, the monitor, when stored within the device main body, is displayed with information necessary to record and reproduce audio information in one portion area faced outside of the device main body, and when slid outside of the device main body, is displayed with information necessary for image capture in the entire area faced outside of the device main body, and at the same time, is displayed with information necessary for the recording and reproduction and the like of audio information, which is moved to the lower end side of the entire area, and the monitor is switched mainly to a image capture monitor.

Consequently, when the mode of the device main body is changed according to multi-function, the recording and reproducing device according to an embodiment of the present invention can display information most suitable for the display area of the monitor which is most suitable for the function used in association with this change, and operability and convenience can be enhanced without performing the setup of the display selector buttons and the like and operation thereof.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 13A to 13F are sectional views showing states in which an image capture lens of the camera unit is rotated and operated;

FIGS. 14A to 14F are views showing states in which the click plate of a rotation support mechanism and a plate spring are rotated and operated together with the image capture lens;

FIGS. 17A to 17F are views showing states in which a first cam of an operation cam member operates the first switch; and FIGS. 18A to 18F are views showing states in which a second cam of the operation cam member operates a second switch.

DETAILED DESCRIPTION OF THE EMBODIMENT

Figure 1:
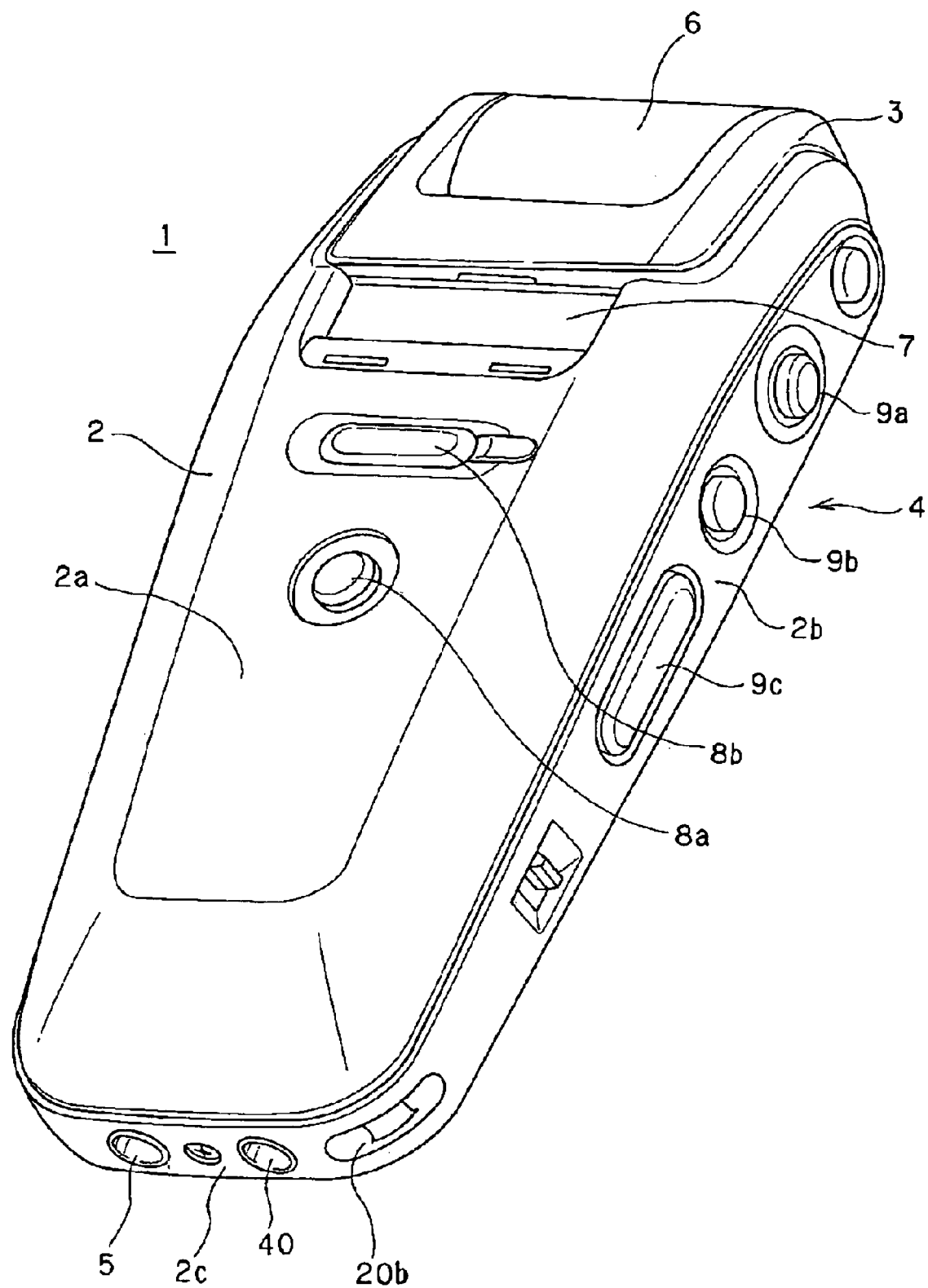
FIG. 1 is an oblique view showing a state in which a movable portion of the recording and reproducing device adapted to an embodiment of the present invention is stored.
Figure 2:
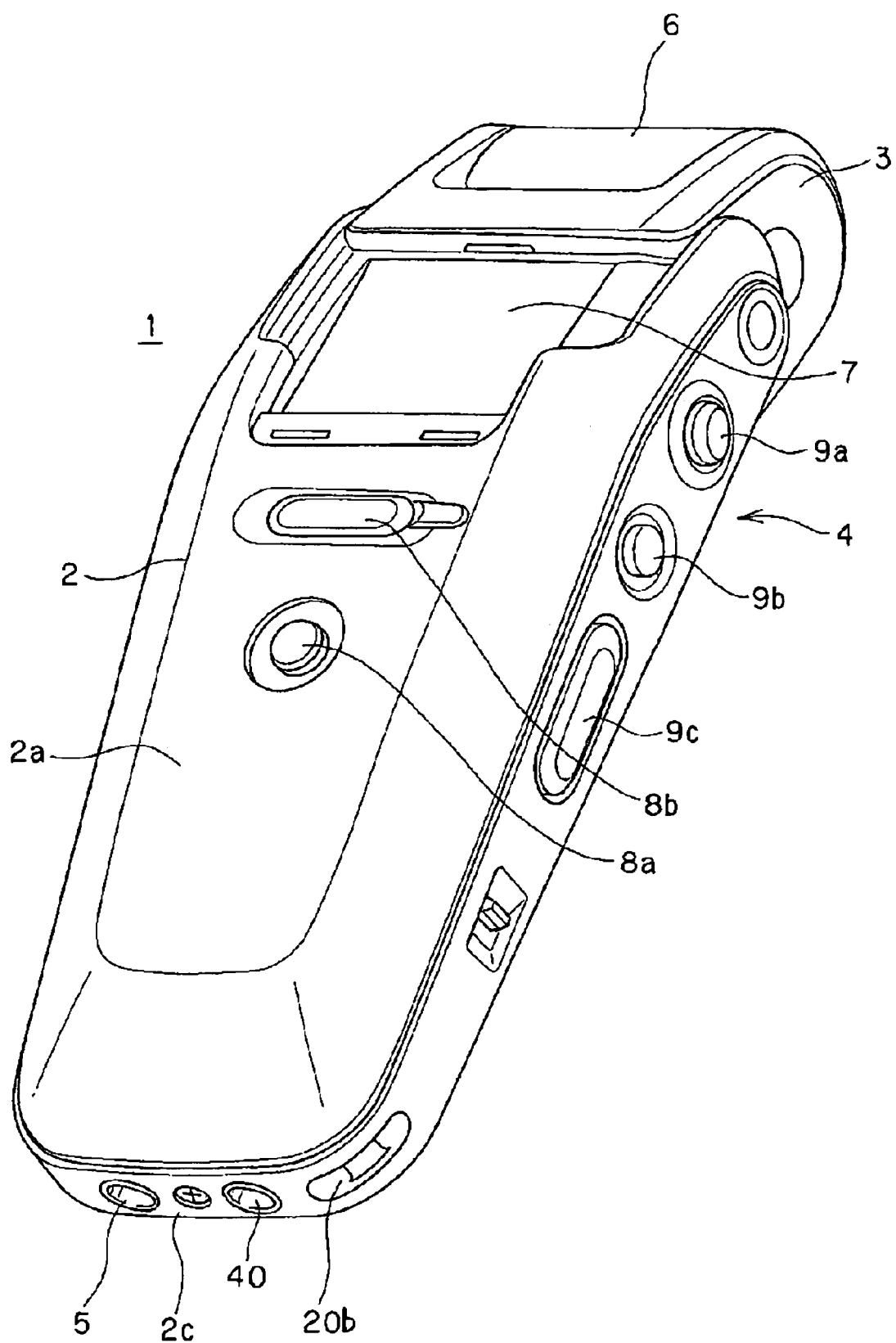
FIG. 2 is an oblique view showing a state in which the movable portion of a recording and reproducing device adapted to an embodiment of the present invention is protruded.

A recording and reproducing device adapted to an embodiment of the present invention will be described in detail with reference to the accompanying drawings. A recording and reproducing device 1 adapted to an embodiment of the present invention, as shown in FIGS. 1 and 2, has a device main body 2 formed approximately in a rectangle shape, and is a so-called IC recorder with a built-in IC chip for storing a highly directional microphone and audio information into a device main body 2. The recording and reproducing device 1 is gripped by one hand by an user, and records audio information by the operation of an operation button group 4 disposed in a main surface portion 2a and a side surface portion 2b of the device main body 2, and outputs audio information by inserting a head phone plug into a headphone jack 5 provided in a lower surface portion 2c of the device main body 2.

Further, the recording and reproducing device 1 adapted to an embodiment of the present invention includes a camera unit 6 built with an image capture lens and an image sensor above the device main body 2, and a liquid crystal monitor 7 displayed with image information and character information, and as shown in FIG. 2, includes a movable block 3 slidably built in the longitudinal direction of the device main body 2. The recording and reproducing device 1 can record by using the camera unit 6 of the movable block 3, and at the same time, can capture a still image, and can record a state when certain audio information is recorded in association with this sound. This image capture scene is displayed in the liquid crystal monitor 7, and can be used as an index when audio information at the image capture time is retrieved and reproduced.

Figure 3:
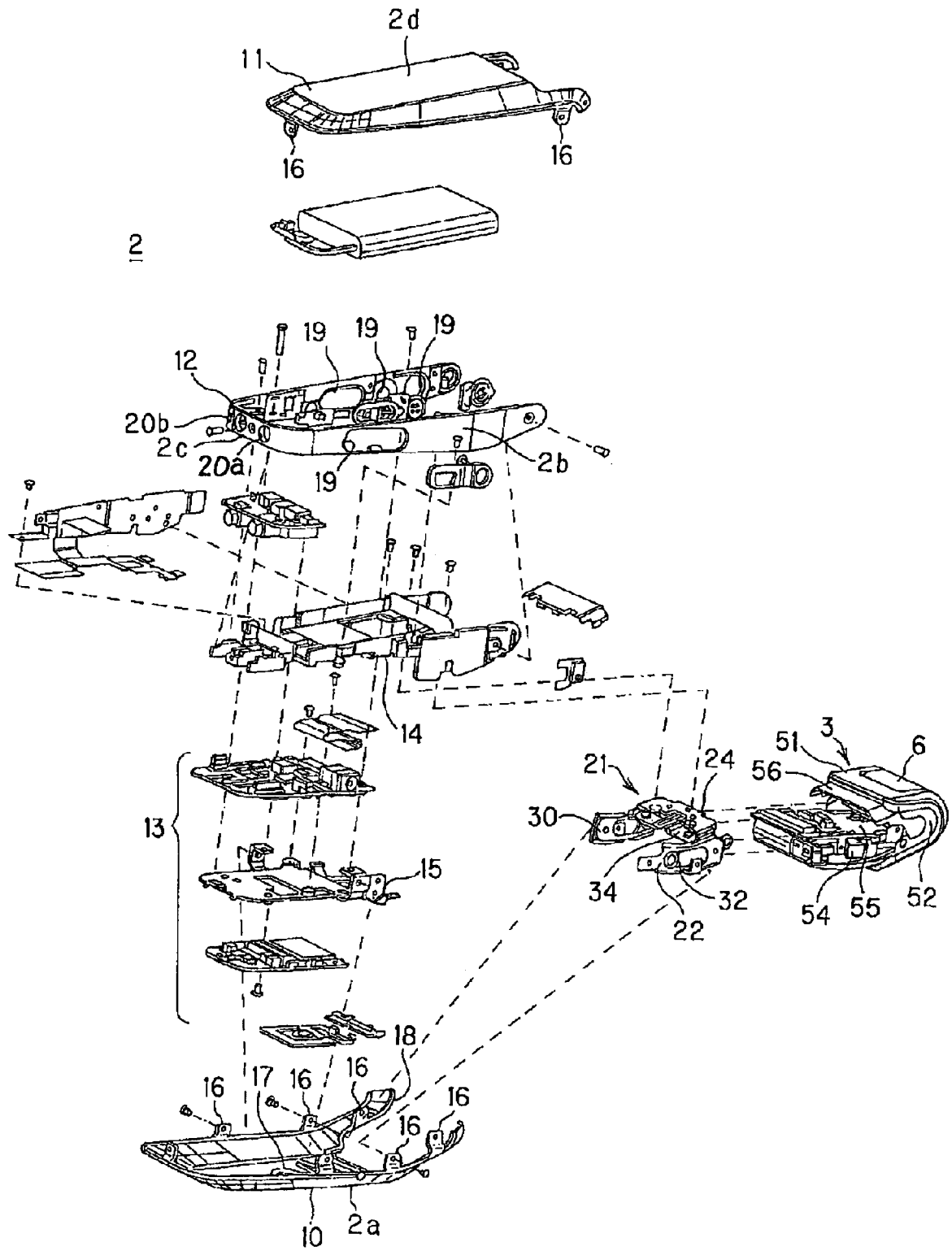
FIG. 3 is an exploded oblique view of the recording and reproducing device adapted to an embodiment of the present invention.

The device main body 2 of such a recording and reproducing device 1, as shown in FIG. 3, includes upper and lower halves 10 and 11, and an armoring frame 12 nipped by the upper and lower halves 10 and 11 and configuring the side surface portion 2b of the device main body 2. Further, the device main body 2 is mounted with various electronic apparatuses, and has a wiring board group 13 formed with various electronic circuits, a main frame 14 and a sub frame 15 mounted with the group of wiring boards 13, and this main frame 14 is connected to the upper and lower halves 10 and 11 and the armoring frame 12.

The upper and lower halves 10 and 11 are configured by a metallic plate formed approximately in a rectangle shape, and its center portion is flattened with an inclined surface formed on the outer peripheral portion. These upper and lower halves 10 and 11 are provided with a plurality of connecting pieces 16 provided with the armoring frame 12, the main frame 14 and screw holes to be connected with the wiring board group 13. Further, the upper half 10 is perforated with an opening portion 17 approximately in the center, which allows a recording button and a shutter button for operating the camera unit 6 to be described later to be faced outside, and further upward, there is formed a square notched portion 18 which allows the portion or the whole of the liquid crystal monitor 7 (described later) to be faced outside.

The armoring frame 12 nipped by these upper and lower halves 10 and 11 is configured by a metallic plate bent and formed approximately in a U-shape, and by being nipped by the upper and lower halves 10 and 11, the frame 12 configures a side surface portion 2b and a lower surface portion 2c of the device main body 2, which become a gripping portion of the device main body 2 by the user. This armoring frame 12 is formed with an operation button opening portion 19 on the side surface portion 2b, which allows the operation button group 4 of the device main body 2 to be faced outside.

Further, the armoring frame 12 is formed with a headphone opening portion 20a in the center portion of the lower surface portion 2c which allows a headphone jack 5 to be faced outside, and is formed with a strap opening portion 20b mounted with a strap for carrying the device main body 2 in a corner portion between the lower surface portion 2c and the side surface portion 2b. That is, even when the headphone and the carrying strap are mounted also on the device main body 2 at the same time, since the headphone opening portion 20a and the strap opening portion 20b are formed isolated approximately in the center of the lower surface portion 2c of the device main body 2 and in the corner portion, the headphone and the strap are prevented from being entangled with each other, thereby making it easy to handle the device main body 2. Further, because of the forming of the headphone opening portion 20a and the strap opening portion 20b in the lower surface portion 2c of the device main body 2, when the device main body 2 is gripped with the main surface portion 2a directed toward the operator side in a state in which the recording and reproducing device 1 is carried with the strap hung from a neck, the fingers are naturally placed on the group of operation buttons 4 such as the recording button 8a, the shutter button 8b, and the like, and therefore, the recording or the image capture operation can be performed in association with the gripping operation of the device main body 2, and even when the recording and the image capture operations are performed in a hurry, such operations can be easily addressed. The armoring frame 12 is provided with the connection pieces provided with the main frame 14 and screw holes to be connected to the group of wiring boards 13. Further, the under surface portion 2c of the armoring frame 12 is provided with a microphone jack 40 along with the headphone jack 5.

The main frame 14 built into the inner space of the device main body 2 is, for example, a metallic frame made by magnesium die cast, and the upper and lower halves 10 and 11 and the armoring frame 12 are screwed from within. Further, the main frame 14 is screwed with a chassis 21 which can slidably engage with the movable block 3 to be described later.

The wiring board group 13 built into this main frame 14 and a sub frame 15 includes a CPU, a highly directional microphone, a main board mounted with the operation button group 4 and the like, a camera unit board for driving and controlling the camera unit 6, and a LCD board and the like for driving and controlling the liquid crystal monitor 7. The wiring board group 13 is connected to the camera unit 6 provided in the movable block 3 and the liquid crystal monitor 7 through a flexible wiring plate.

The operation button group 4 provided for the wiring board group 13, as shown in FIG. 1, is faced mainly on the main surface portion 2a and the side surface portion 2b of the device main body 2. From among which, the main surface portion 2a of the device main body 2 is disposed with the recording button 8a for starting recording audio information and the shutter button 8b for performing image recording by the camera unit 6. These recording button 8a and the shutter button 8b are disposed on the main surface 2a of the device main body 2, and when the device main body is gripped by the user, the fingers are naturally placed on the buttons, so that urgent recording and image capture can be timely performed without difficulty.

Figure 4:
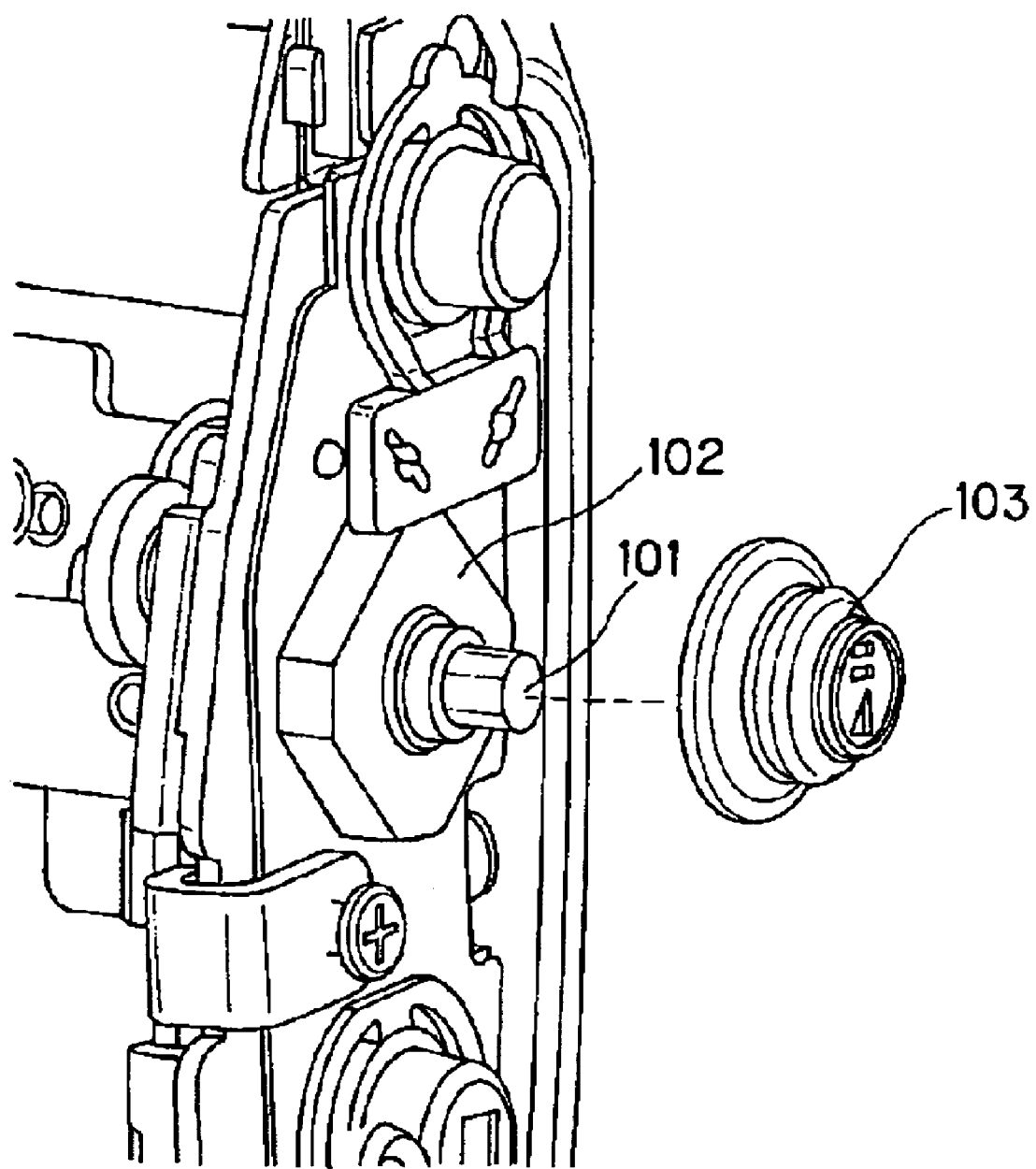
FIG. 4 is an exploded oblique view showing a portion of the selector button of the recording and reproducing device adapted to an embodiment of the present invention.

Further, the side surface portion 2b of the device main body 2 is provided with a multi-directional switch 9a for performing fast forwarding and quick return, skipping and the like, an operation stop button 9b, a volume control button 9c and the like. From among which, the multi-directional switch 9a, as shown in FIG. 4, includes a stem 101 capable of inclined operations toward four directions and push operations, a support mechanism (not shown) for supporting the stem 101 so as to freely perform inclined operations and push operations, a housing 102 built with a terminal, and a synthetic resin key top 103 for covering the stem 101. The multi-directional switch 9a can perform the operations of fast forwarding and quick return and a display change of the liquid crystal monitor 7, and the like when the stem 101 is operated for inclined operations and push operations from above the key top 103.

Such recording and reproducing device 1, when provided at the side surface portion 2b of the device main body 2, has the fingers naturally positioned when the device main body 2 is gripped by the user, and at the same time, through the use of the multi-directional switch 9a, a plurality of operations can be performed by inclined operations or push operations of the key top 103, and operational strokes of the fingers for operations are made small, thereby enhancing usability of the user.

Figure 5:
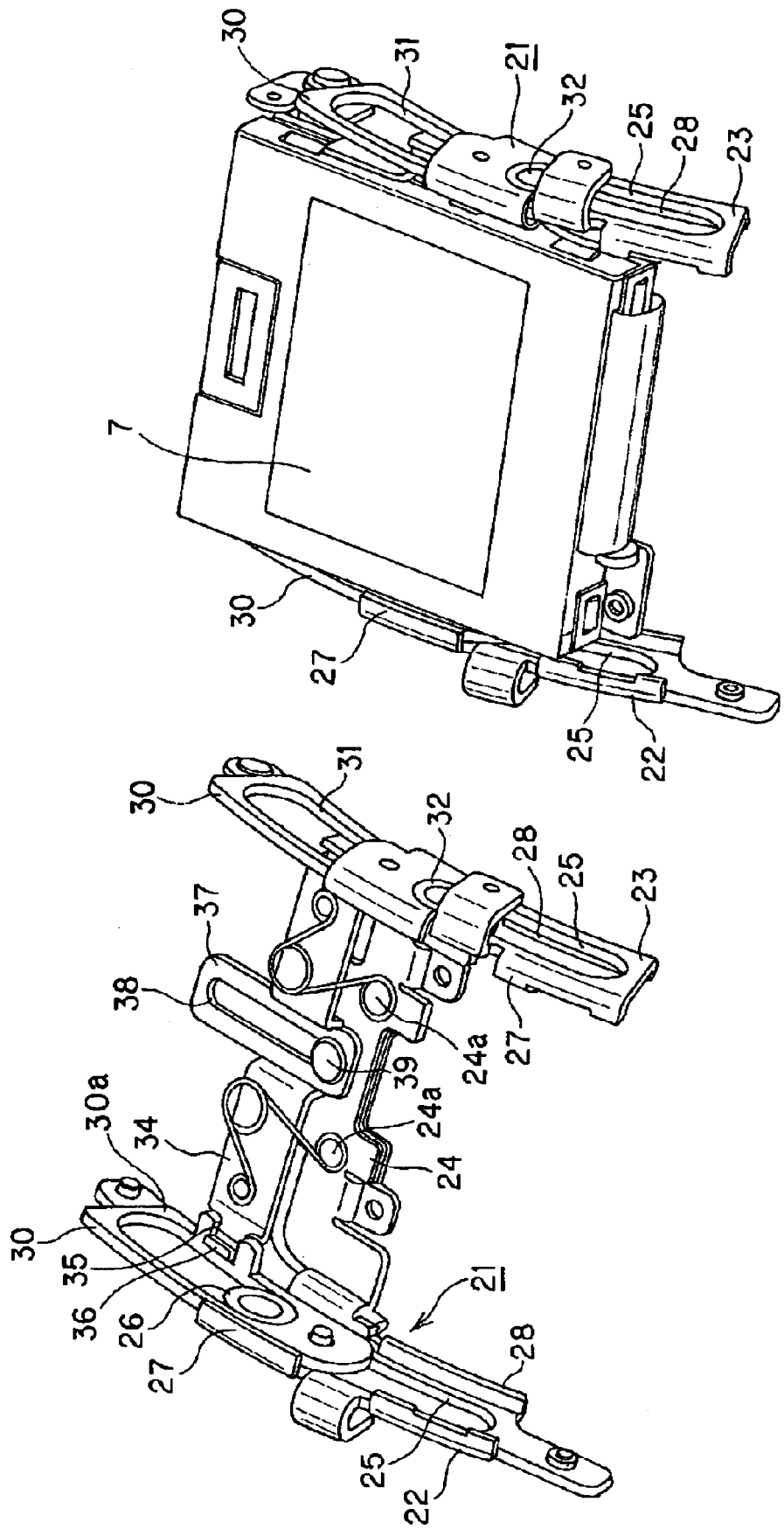
FIG. 5 is an oblique view showing a chassis and a sliding plate.
Figure 6:
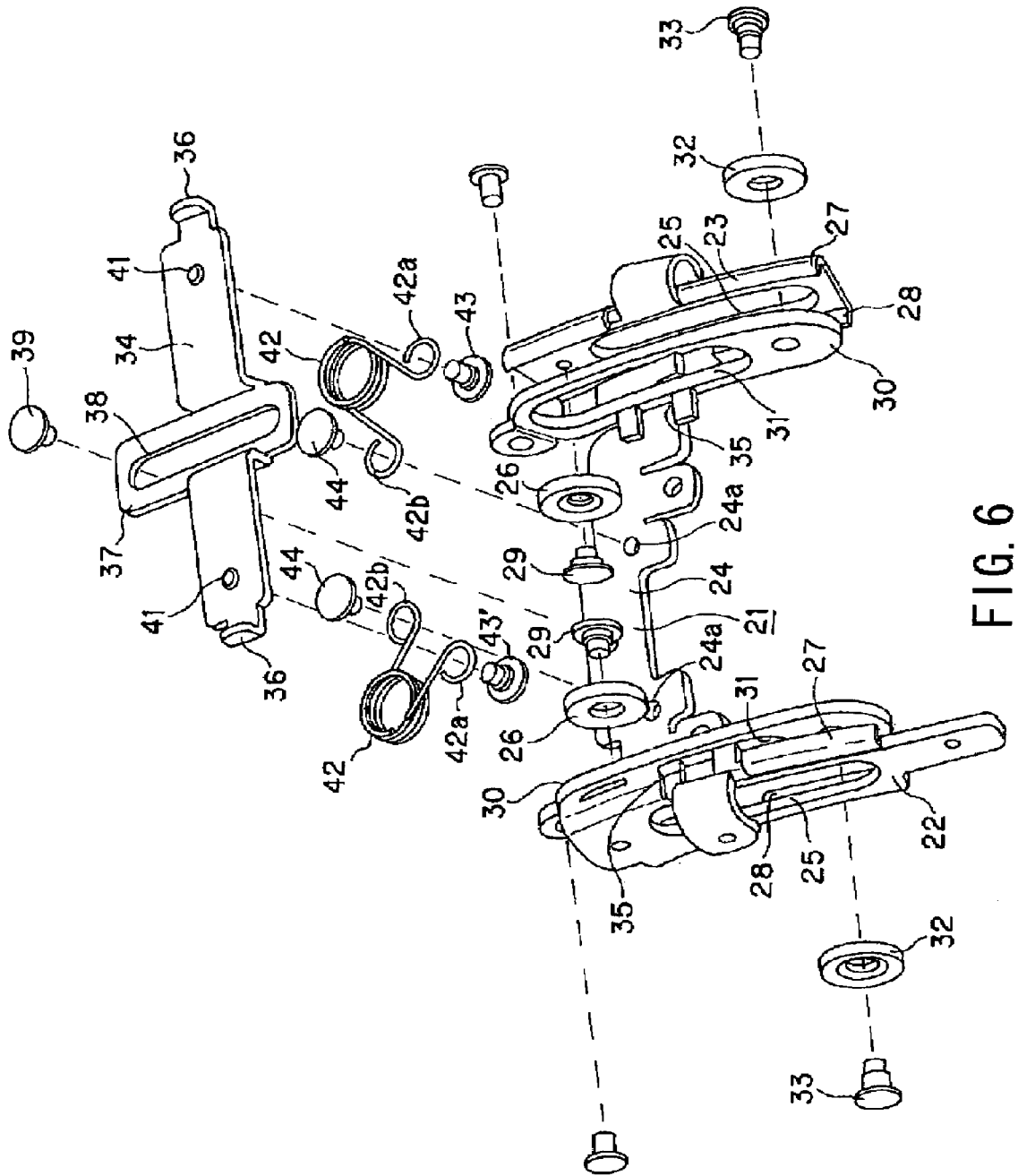
FIG. 6 is an exploded oblique view showing a chassis and a sliding plate.

Next, a chassis 21 connected to the main frame 14 and the movable block 3 connected through this chassis 21 will be described. First, the chassis 21 allows the movable block 3 to slidably engage with the longitudinal direction of the device main body 2, and as shown in FIGS. 5 and 6, has mutually opposed side wall portions 22 and 23 and a junction portion 24 spanned between these side wall portions 22 and 23, and is formed approximately in a horseshoe shape. The side wall portions 22 and 23 each are slid by sliding plates 30 provided at the movable block 3 side, and are rotatably provided with slide guide grooves 25 for guiding the sliding of these sliding plates 30 and disc rollers 26 engaged with slide guide grooves 31 provided at the sliding plates 30 side. Further, the sidle wall portions 22 and 23 are formed with upper and lower support walls 27 and 28 for supporting the sliding plates 30 along the sliding direction of the sliding plates 30 at the upper edge portion and the lower edge portion.

When this chassis 21 is built into the device main body 2, the side wall portions 22 and 23 are bent and formed from the main surface portion 2a to the rear surface portion 2d of the device main body 2 across the longitudinal direction of the device main body 2, and the slide guide grooves 25 formed in the side wall portions 22 and 23 are also similarly bent and formed. This slide guide groove 25 is formed larger in curvature of the lower end side, which allows the movable block 3 to slide into the device main body 2. Consequently, when the movable block 3 is slid into the device main body 2, the movable block 3 is slid in such a manner as to depict a circular arc as if a swing support point moves to the rear surface portion 2d side of the device main body 2. In this way, the device main body 2 has component parts such as the liquid crystal monitor 7 and the like of the movable block 3 inclined to the rear surface portion 2d of the device main body 2 and stored, and between the main surface portion 2a and itself, can secure an allocation space of the recording button 8a and the shutter button 8b and operation members such as the wiring boards formed with these operation circuits and the like. The description thereof will be made more in detail later.

Further, the rollers 26 provided in the side wall portions 22 and 23 are rotatably connected to the side wall portions 22 and 23 by machine screws 29. These rollers 26 roll in the slide guide grooves 31 formed in the sliding plates 30, thereby smoothly performing the sliding between the chassis 21 and the sliding plates 30.

The sliding plates 30 slidably engaged with the chassis 21 are connected to the movable block 3, and this allows the movable block 3 to slide up and down for the device main body 2. This sliding plate 30 is configured to have a metallic plate formed in a rectangle shape, and is provided in a pair corresponding to the side wall portions 22 and 23 of the chassis 21. The sliding plates 30 include slide guide grooves 31 in which the rollers 26 rotatably formed in the side wall portions 22 and 23 of the chassis 21 roll, and rollers 32 which roll in the slide guide grooves 25 formed in the side wall portions 22 and 23 of the chassis 21. The slide guide grooves 31 are bent in the same curvature as the slide guide groves 25 formed in the side wall portions 22 and 23 of the chassis 21. Further, the rollers 32 are rotatably connected to the sliding plates 30 by machine screws 33.

Further, the sliding plates 30 are formed with engaging recess portions 35 for engaging with a coupling portion 34 for coupling a pair of sliding plates 30 in opposing inner side surface portions 30a. The engaging recess portions 35 are engaged with engaging protrusions 36 provided from both end portions of the longitudinal direction of the coupling plate 34.

The coupling plate 34 for coupling the sliding plates 30 is formed with a guide portion 37 extended in the sliding direction of the sliding plate 30 approximately in the center portion of the longitudinal direction of the coupling plate 34. The guide portion 37 is provided with a guide groove 38 for guiding the sliding of the sliding plates 30 across the longitudinal direction of the guide portion 37, and a guide pin 39 is movably inserted through this guide groove 38 and is coupled with the coupling portion 24 of the chassis 21. Further, the coupling plate 34 is perforated with engaging holes 41 at both sides nipping the guide portion 37, and with these holes, one end each of torsional coil springs 42 is engaged. The engaging hole 41 is inserted with a machine screw 43 which pierces through a circular engaging portion 42a formed at one end of the torsional coil spring 42. The torsional coil springs 42 have circular engaging portions 42b formed at another end engaged with engaging holes 24a perforated in both sides of the coupling portion 24 of the chassis 21 by the machine screws 44. The torsional coil spring 42 is reversed in urging direction according to the sliding positions of the sliding plate 30 and the coupling plate 34, and protrudes the movable block 3 above the device main body 2 and stores it into the device main body 2.

The chassis 21 and a pair of sliding plates 30 as described above have the sliding plates 30 supported between the upper and lower support walls 27 and 28 provided in the side wall portions 22 and 23 of the chassis 21, and at the same time, the rollers 32 formed in the sliding plates 30 are rollably engaged with the slide guide grooves 25 formed in the chassis 21, and moreover, the rollers 26 formed in the chassis 21 are rollably engaged with the slide guide grooves 31 formed in the sliding plates 30. In this way, the sliding plates 30 and the coupling plate 34 coupled between a pair of sliding plates 30 are made slidable with the rollers 32 guided in the slide guide grooves 25. At this time, the rollers 26 formed in the chassis 21 roll in the slide guide grooves 31 formed in the sliding plates 30, so that sliding friction is almost eliminated and a sliding can be made with no sense of resistance. The sliding plate 30 is guided in sliding even by the movement of the guide pin 39 inserted into the coupling portion 24 of the chassis 21 through the guide groove 38 formed in the guide portion 37 of the coupling plate 34.

These sliding plates 30 and the coupling plate 34 are connected with the movable block 3, and the sliding plates 30 slide the chassis 21, thereby allowing the sliding plates 30 to slide along the longitudinal direction of the device main body 2. This movable block 3, as shown in FIG. 7, includes the camera unit 6 built with the image capture lens and the image sensor in a cylindrical unit main body, a rotation support mechanism 50 rotatably supporting the camera unit 6, a cover member 51 for supporting the camera unit 6 and protecting the image capture lens, the liquid crystal monitor 7 for displaying information and images necessary for recording and reproduction and the like, a liquid crystal protection cover 52 for protecting the liquid crystal monitor 7, a cover glass 53 of the liquid crystal monitor 7, a movable chassis 54 mounted with the camera unit 6 and the liquid crystal monitor 7, a wiring board 55 formed with the drive circuits and the like of the camera unit 6 and the liquid crystal monitor 7, and a decoration plate 56 for covering the rear surface side of the movable block 3.

Figure 7:
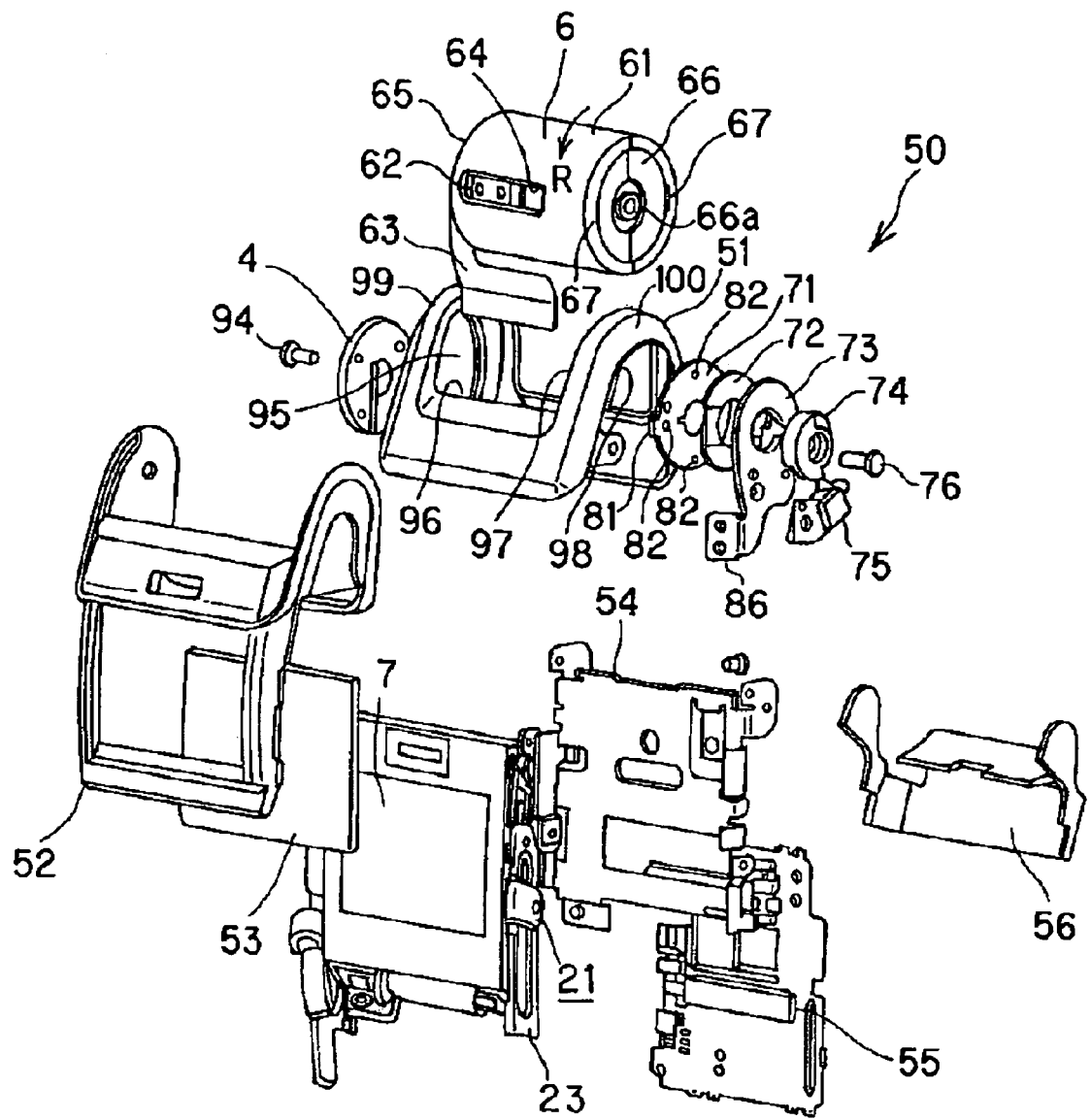
FIG. 7 is an exploded oblique view showing a movable block.
Figure 8:
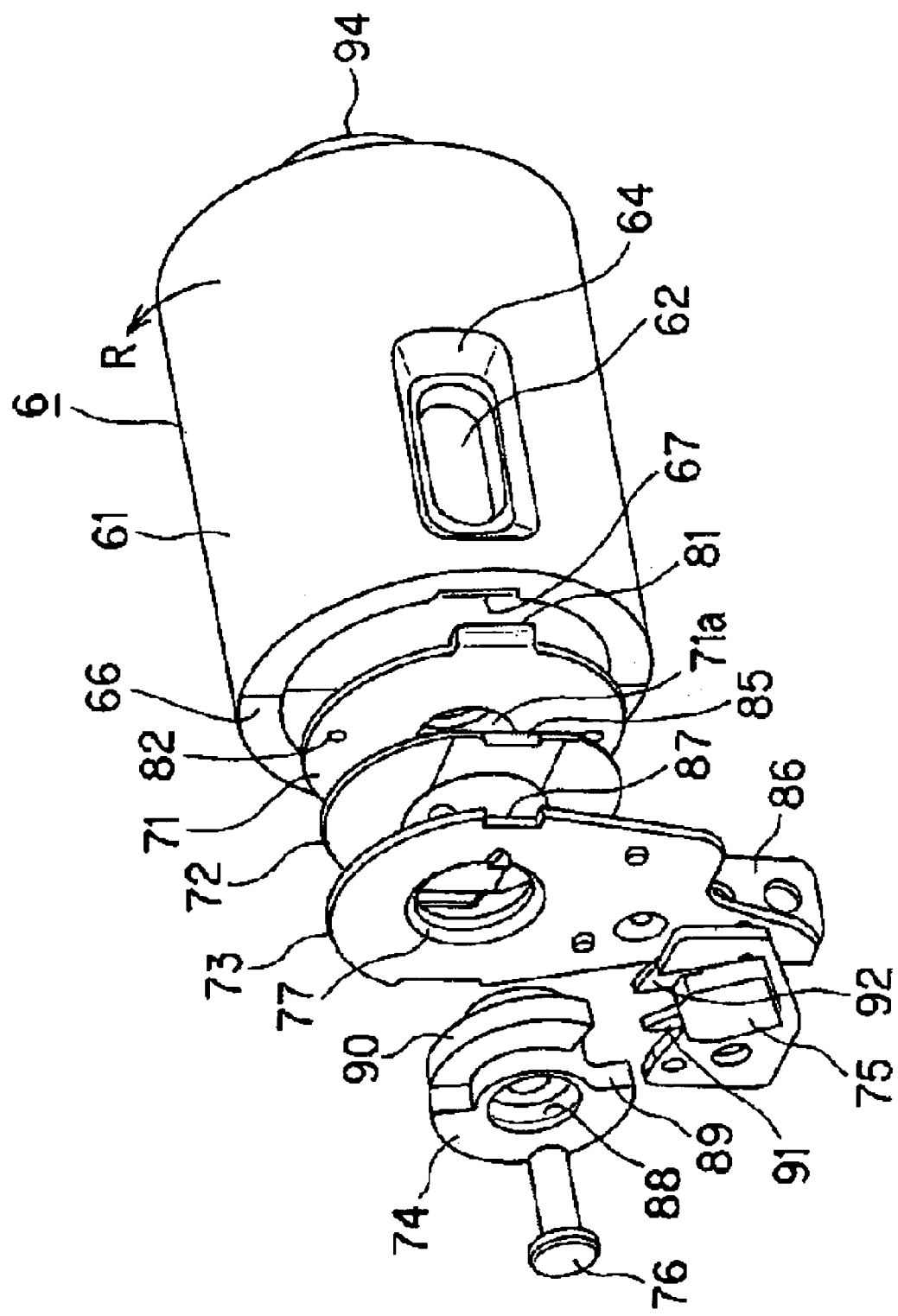
FIG. 8 is an exploded oblique view showing a camera unit and a rotation support mechanism to support the camera unit.
Figure 9:
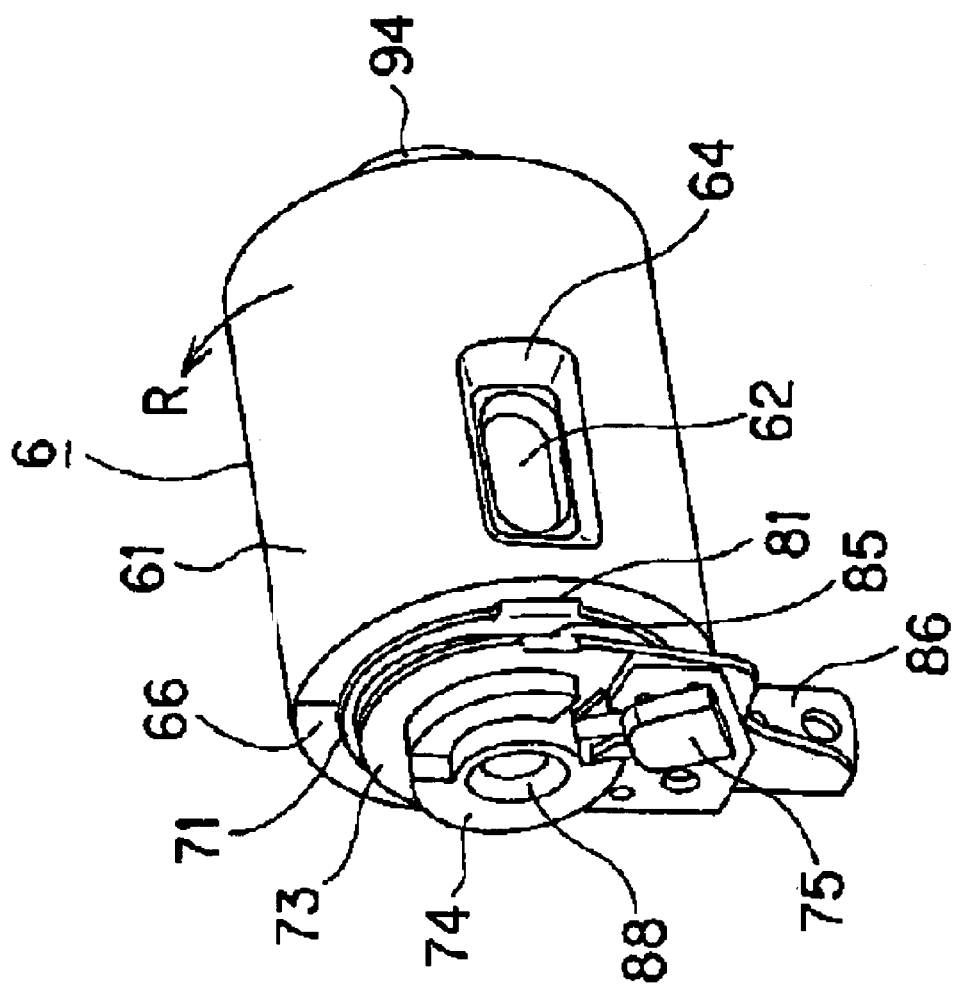
FIG. 9 is an oblique view showing a camera unit and a rotation support mechanism to support the camera unit.

The camera unit 6, as shown in FIGS. 7 to 9, has an image capture lens 62 for capturing image information into a cylindrical unit main body 61, an image sensor (not shown) such as a CCD element, a CMOS sensor, and the like for converting the image captured by the image capture lens 62 into electrical signals, and a flexible wiring board 63 for connecting the image sensor to the drive circuit formed in the wiring board 55 and the like. The unit main body 61 is formed with a lens opening 64 for allowing the image capture lens 62 to face outside on the outer peripheral surface, and with both the left and right side surfaces 65 and 66 supported by the rotation support mechanism 50, it is possible to rotate this lens opening 64 in the direction of an arrow mark R in FIG. 7 which is an orbiting direction of the outer periphery, and in the counter direction of the arrow ark R within the predetermined rotational angle. The lens opening 64 and the image capture lens 62 are provided in positions biased to a side surface side of the outer peripheral surface of the unit main body 61, and therefore, adhesion of dirt on the image capture lens 62 through the direct touching of the lens opening 64 by the fingers of the user who rotationally operates the unit main body 61 can be prevented. Further, both the left and right side surfaces 65 and 66 of the unit main body 61 have insertion holes 65a and 66a, which are inserted with a support pin 76 of the rotation support mechanism 50, formed in the center portion. Further, the right side surface 66 is formed with an engaging recess portion 67, which is engaged with a click plate 71 of the rotation support mechanism 50.

Such camera unit 6 is rotatably supported by the rotation support mechanism 50, and therefore, can rotate in the orbital direction of the outer peripheral surface, and is rotationally operated by the fingers of the user placed on the outer periphery. To be more specific, the camera unit 6 has an image captured with the lens opening 64 rotated to face outside at the image capture time, and has the image capture lens 62 protected with the lens opening 64 rotated inside the cover member 51 provided in the lower side of the unit main body 61 at the non using time of the camera unit 6. The outer peripheral surface of the unit main body 61 may be formed, for example, with a finger rest recess portion for resting the fingers of the user on the surface of the opposite side isolated from the lens opening 64 and a finger rest configured by small tongued and grooved surfaces, thereby making it easy for the camera unit 6 to rotate.

Further, when the unit main body 61 is rotated, the camera unit 6 has a rotational angle detected by the rotation support mechanism 50 to be described later, and according to this rotational angle, the operation mode of the device main body 2 is changed.

The rotation support mechanism 50 rotatably supports the camera unit 6, and at the same time, detects the rotational angle of the unit main body 61, and sensibly executes the switchover of the operation mode change according to the rotational angle and the operation mode of the device main body 2 by giving a click sense according to this rotational angle. This rotation support mechanism 50, as shown in FIGS. 7 to 9, includes a click plate 71 rotated together with the unit main body 61 of the camera unit 6, a plate spring 72 giving a click sense to the click plate 71, a fixed plate 73 connected to a movable chassis to be described later, an operation cam member 74 for detecting the rotational angle and operating a change switch of the operation mode, a detection switch member 75 operated by the operation cam member 74, and the support pin 76 inserting each of these members and journaled on the unit main body 61 and, at the same time, rotatably supporting the unit main body 61.

The click plate 71 includes a metallic plate approximately in a circular plate shape formed with an insertion hole 71a of the supporting pin 76 in the center portion. The click plate 71 is formed with a bent engaging piece 81 engaged with a engaging recess 67 formed in the right side surface 66 of the unit main body 61 in the outer peripheral surface, and this engaging piece 81 is engaged with the engaging recess 67, thereby rotating together with the unit main body 61. Further, the click plate 71 is perforated with a plurality of click holes 82 at predetermined places, the click holes 82 being engaged with protrusions 84 formed on the plate springs 72 at the opposite side of the unit main body 61. Consequently, when the click plate 71 is rotated together with the unit main body 61, the operation mode of the device main body 2 is changed according to the rotational angle, and at the same time, according to this rotational angle, the protrusions 84 of the plate springs 72 are engaged with the perforated click holes 82, thereby giving a click sense. The change of the operation mode according to the rotational angle will be described later.

The plate spring 72 is configured to include a circular metallic plate having elasticity, and on the opposite surface of the click plate 71, there is formed the protrusion 84 to be engaged with the click hole 82. Further, the plate spring 72 is formed with an engaging piece 85 bent to the fixed plate 73 side, the engaging piece 85 being engaged with an engaging groove 87 formed in the fixed plate 73 on the outer peripheral portion. The plate spring 72 is engaged with the fixed plate 73 so as to be connected to a movable chassis 54 through the fixed plated 73, and is not rotated even by the rotation of the camera unit 6. Consequently, the click hole 82 of the click plate 71, which is rotated together with the camera unit 6, is engaged with the protrusion 84, thereby giving a click sense according to the rotational angle of the camera unit 6.

The fixed plate 73 engaged with the plate spring 72 has a connection piece 86 extended to the movable chassis 54 side from a portion of the circular metallic plate in which an insertion hole 77 of the support pin 76 is formed in the center portion. The fixed plate 73, in its approximate circular outer peripheral portion, is formed with an engaging groove 87 to be engaged with the engaging piece 85 protruded from the plate spring 72. Further, the fixed plate 73 is fixed by screwing the connection piece 86 to the movable chassis 54. This connection piece 86 is connected to a detection switch member 75 for detecting the rotational angle of the camera unit 6 and converting the operation mode of the device main body 2.

The operation cam member 74 for performing the switch operation of this detection switch member 75 is approximately in the shape of a cylinder formed with an insertion hole 88 to be inserted with the support pin 76 in its center, and is provided with a first cam 89 and a second cam 90 across the predetermined range in the outer peripheral direction at one end side and the other end side of the insertion hole 88. The first and second cams 89 and 90 correspond to a first switch 91 and a second switch 92 formed in the detection switch member 75, respectively, and when the operation cam member 74 is rotated accompanied with the rotation of the camera unit 6, the cams press the first and second switches 91 and 92 of the detection switch member 75 according to the rotational angle, and allow the conversion of the operation mode to be executed. These first and second cams 89 and 90 are adjusted in the formation range in the outer peripheral direction, so that the operation timing of the detection switch member 75 can be adjusted. Further, the operation cam member 74 has the camera unit 6 side engaged with the click plate 71 by going through each insertion hole of the fixed plate 73 and the plate spring 72. Consequently, when the unit main body 61 of the camera unit 6 is rotated and operated, the operation cam member 74 is rotated together with the click plate 71.

The support pin 76 rotatably supporting the unit main body 61 is inserted into the insertion holes formed in the click plate 71, the plate spring 72, the fixed plate 73, and the operation cam member 74, and is inserted into the insertion hole 66a formed in the right side surface 66 of the unit main body 61. This support pin 76, for example, uses a self-tapping screw having threads in its periphery. To the left side surface 65 also of the unit main body 61, the support pin 94 connects a disc decoration plate 93 in which the insertion hole is formed in its center.

The cover member 51 for protecting the camera unit 6 supported by this rotation support mechanisms 50 protects the image capture lenses 62 provided in the unit main body 61 of the camera unit 6 and the unit main body 61, and has a shape squarely notched in the bottom center of the metallic plate which is formed approximately in a U shaped cross-section, and this notched portion is taken as a disposing portion 95 in which the unit main body 61 is disposed rotation-operatively in the orbital direction from the open end side of the notched portion. This disposing portion 95 has a width slightly larger than the width of the unit main body 61, and has a first opening portion 97 allowing the outer peripheral surface of the unit main body 61 to face outside across the predetermined rotational angle and a second opening portion 98 built with the rotation support mechanism 50 for supporting the left and right side surfaces 65 and 66 of the unit main body 61 disposed in the disposing portion 95.

Further, in the opposite side of the open end side of the disposing portion 95, there is formed an opening support portion 96 which prevents the unit main body 61 disposed in the disposing portion 95 from falling down into the cover member 51 and, at the same time, allowing the image capture lens 62 at the non-using time to be faced to the inside of the cover member 51 and protected. This opening support portion 96 has a width slightly shorter than the diameter of the unit main body 61, and allows the lower portion of the outer peripheral portion of the unit main body 61 to enter into the cover member 51 from the opening support portion 96, and at the same time, protects the unit main body 61 from abutting against the outer periphery of the unit main body 61 when pressed downward by the operator, and falling down into the cover member 51.

By being supported by this opening support portion 96, the unit main body 61 disposed in the disposing portion 95 is prevented from a state of falling into the cover member 51 even when the outer peripheral portion facing from the first opening portion 97 is pressed when rotated and operated. Further, the unit main body 61 rotates the image capture lens 62 into the cover member 51 from the opening support portion 96 when the camera unit 6 is not used, thereby protecting the image capture lens 62 from the adherence of dust and the like or scars on the lens surface without being exposed outside.

The disposing portion 95 has arch portions 99 and 100 spanned across the outside of both the left and right side surfaces 65 and 66 of the unit main body 61. By these arch portions 99 and 100, the unit main body 61 has the rotation support mechanism 50 supporting both the left and right side surfaces located below the arch portions 99 and 100, and is designed to stop the slipping out upward of the cover member 51.

The movable chassis 54 connected to the connection piece 86 of the fixed plate 73 of the rotation support mechanism 50 is connected to the sliding plate 30 supported by the chassis 21 built into the device main body 2 side, the liquid crystal monitor 7 connected to this sliding plate 30 and the coupling plate 34, the liquid crystal protection cover 52 for protecting the liquid crystal monitor 7, the wiring board 55 in which the drive circuits and the like of the camera unit 6 and the liquid crystal monitor 7 are formed, and the decoration plate 56 covering the rear surface side of the movable block 3. Further, the liquid crystal monitor 7 is adhered with the cover glass 53 for protecting the monitor section.

Figure 10A:
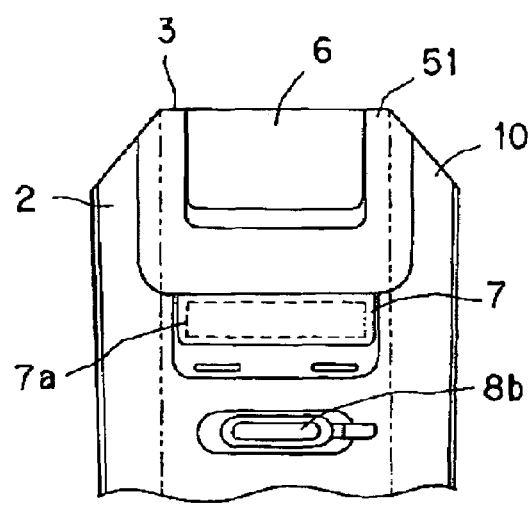
FIGS. 10A and 10B are top views showing the display area of a liquid crystal monitor.

The movable block 3 configured as described above allows the sliding plate 30 connected to the liquid crystal monitor 7 to slide in the slide guide groove 25 of the chassis 21 so that the movable block 3 moves across the storing position inside the device main body 2 shown in FIG. 1 and the protruded position above the device main body 2 shown in FIG. 2. The recording and reproducing device 1, when the movable block 3 is at the storing position shown in FIG. 1, performs normal audio recording and reproducing operations. At this time, the main surface portion 2a of the device main body 2, as shown in FIG. 10A, is faced with an upper edge portion 7a of the liquid crystal monitor 7 from the notched portion 18. The upper edge portion 7a of the liquid crystal monitor 7 is displayed with information necessary for recording and reproducing time or recording and reproducing the memory remaining amount and the like.

Figure 11:
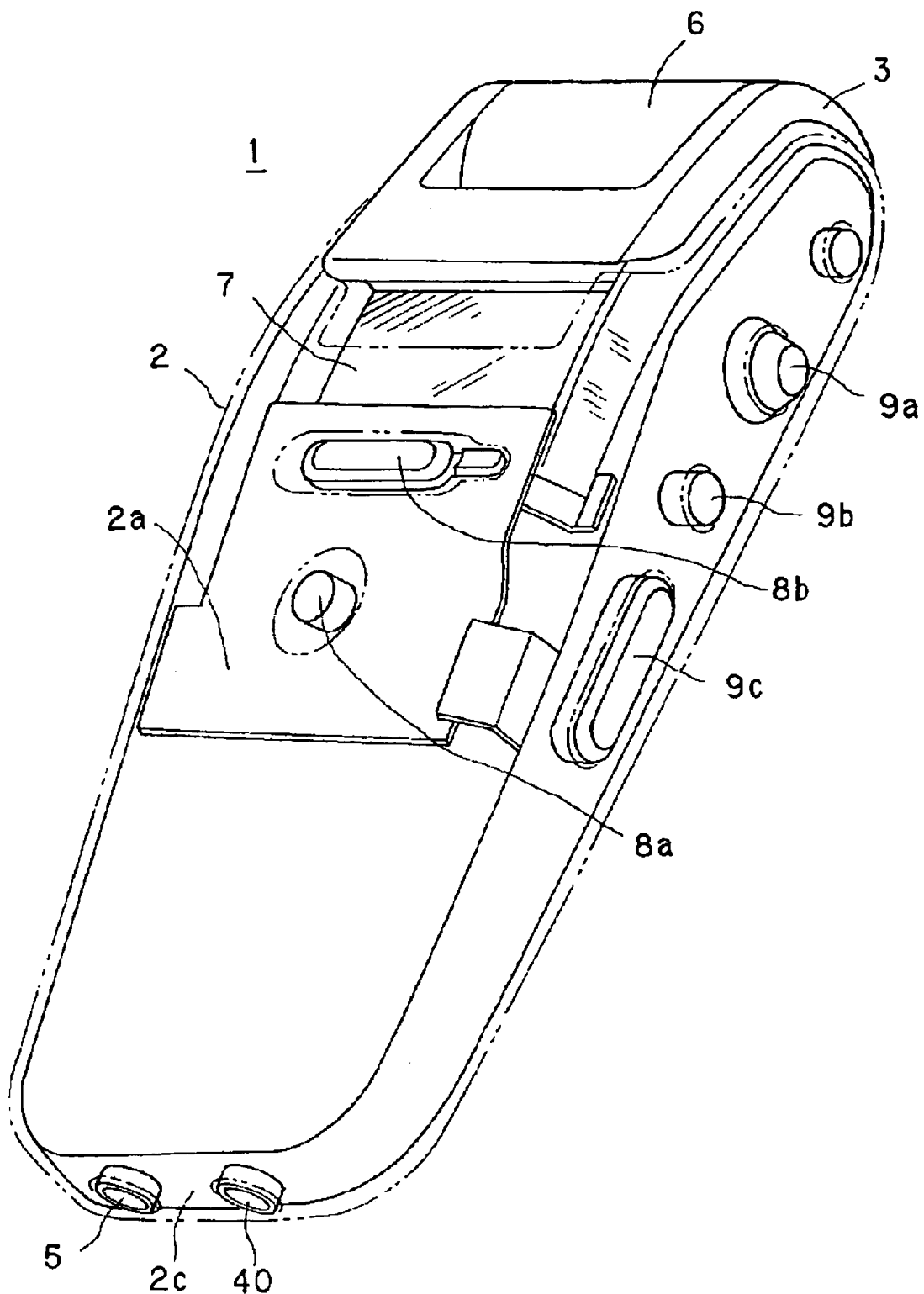
FIG. 11 is an oblique view showing the interior of the recording and reproducing device in a state in which the movable portion is stored.

Further, as described above, the slide guide groove 25 of the chassis 21 engaged with the movable block 3 is formed in the shape of a circular arc bent to the rear surface portion 2d side from the main surface portion 2a of the device main body 2 across the longitudinal direction of the device main body 2, and by sliding such slide guide groove 25 by the sliding plate 30, the movable block 3 connected to this sliding plate 30 is also slid across from the main surface portion 2a to the rear surface portion 2d side, while swinging in a circular arc shape. To be more specific, when the movable block 3 is slid to the storing position inside the device main body 2 shown in FIG. 11, this slide guide groove 25 is formed in the shape of a circular arc so that the swing support point of the movable block 3 slightly moves to the rear surface portion 2d side. Consequently, the movable block 3, when slid to the storing position of the device main body 2, sharply inclines across from the main surface portion 2a to the rear surface portion 2d of the device main body 2, and therefore, a space can be formed between the liquid crystal monitor 7 of the movable block 3 and the upper half 10 configuring the main surface portion 2a of the device main body 2. The recording and reproducing device 1 adapted to an embodiment of the present invention can dispose the wiring board having the recording button 8a to start recording and the shutter button 8b for operating the camera unit 6 and circuits for driving these buttons into the space provided between the liquid crystal monitor 7 of this movable block 3 and the upper half 10 of the device main body 2.

Figure 12:
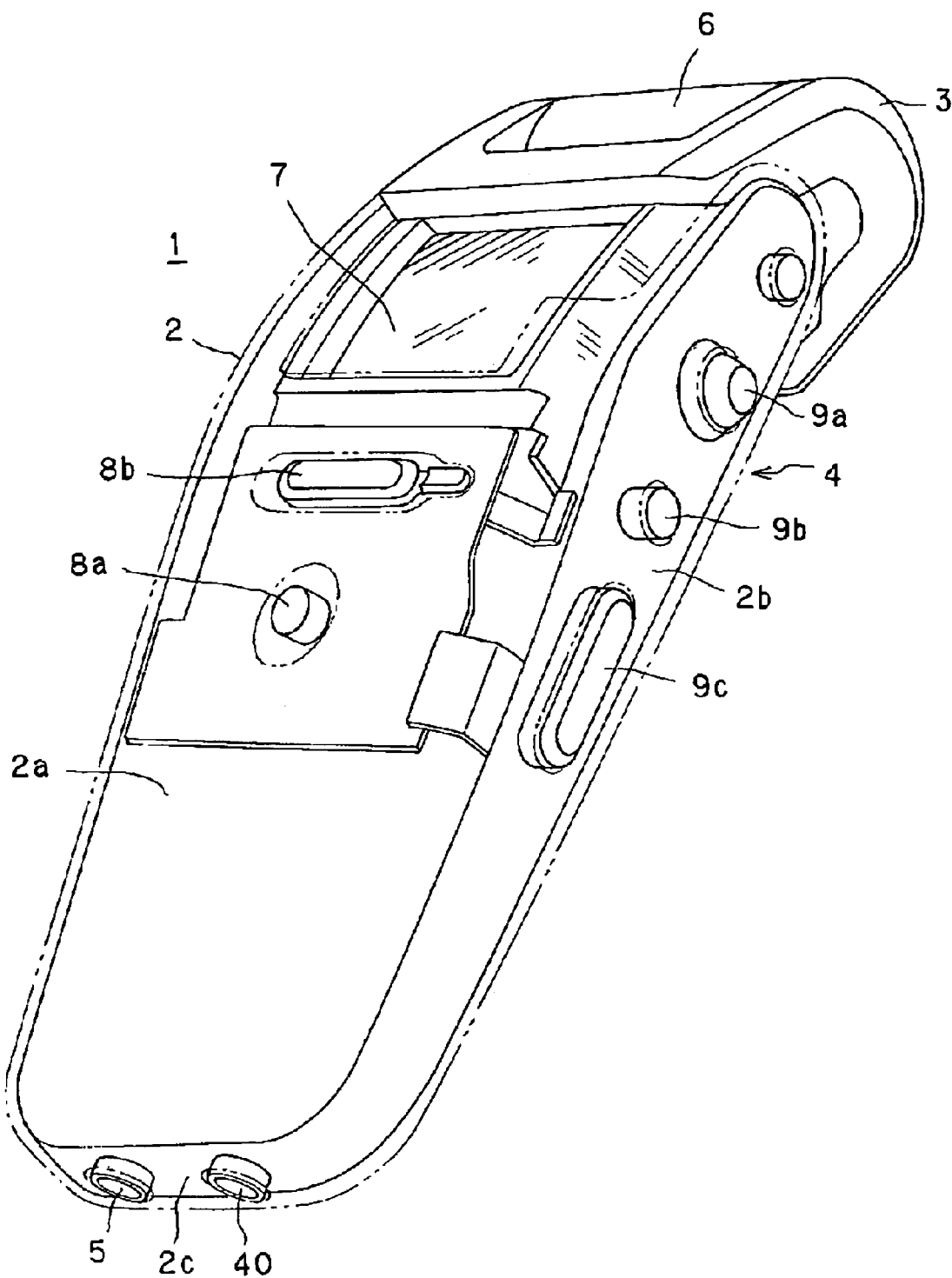
FIG. 12 is an oblique view showing the interior of the recording and reproducing device in a state in which the movable portion is protruded.

In case the image information regarding the audio information during the recording while performing audio recording and the like is captured, the movable block 3 is swung to the protruding positions shown in FIGS. 2 and 12, and the whole of the liquid crystal monitor 7 appears on the main surface portion 2a of the device main body 2. The user, while looking at the image captured in the image capture lens 62 displayed in the liquid crystal monitor 7, rotates and drives the unit main body 61 of the camera unit 6 from the first opening portion 97 of the cover member 51, and performs an angle adjustment, and after that, starts performing an image capture.

At this time, in case the recording and reproducing device 1 has the movable block 3 swung to the protruded position above the device main body 2 shown in FIGS. 2 and 12, since the shutter button 8b is positioned in the vicinity of the liquid crystal monitor 7, the user can allow the movable block 3 to slide upward by using the thumb of the hand gripping the device main body 2 and rotate and drive the unit main body 61, and at the same time, the user can quickly position this thumb on the shutter button 8b, and can also confirm the shutter button 8b while confirming an image captured screen by the liquid crystal monitor 7, and can perform a quick shutter operation.

Figure 10B:
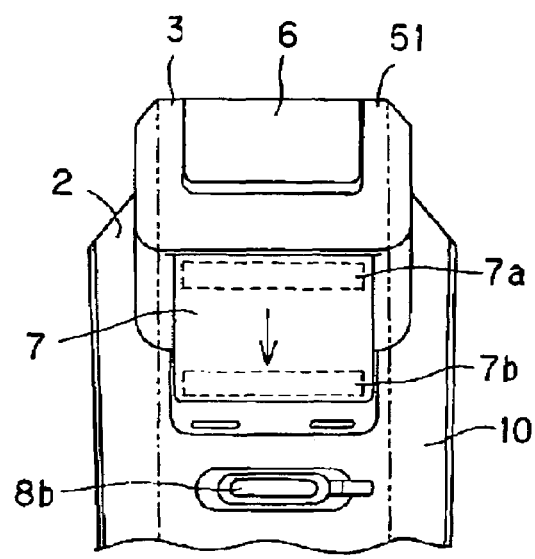

Further, the liquid crystal monitor 7, as shown in FIG. 10B, has the information necessary for recording and reproducing or the like of the audio information displayed in an upper edge portion 7a when the movable block 3 is stored inside the device main body 2 moved and displayed in a lower edge portion 7b, and can be used mainly as an image capture monitor. That is, in case the movable block 3 is slid to the storing position inside the device main body 2 and only a portion of the liquid crystal monitor 7 appears, the recording and reproducing device 1 is used only in recording function, and therefore, the information necessary for this is displayed in the minimum display area of the liquid crystal monitor 7, and when the movable block 3 is slid to the protruding position upward the device main body 2 and the whole of the liquid crystal monitor 7 appears, in addition to the recording function, an image capture function is also used, and therefore, in association with this, the display content of the liquid crystal monitor 7 is displayed in the most appropriate display area from the information suitable for audio recording and audio reproduction to the information suitable for image capture and image reproduction. Consequently, the recording and reproducing device 1 has an image capture function also in addition to the recording function, and when the mode of the device main body 2 changes according to such multi-functions, in association with this change, the most appropriate information can be displayed in the most appropriate display area for those functions, and there may be no need to perform setting up and operating display change buttons and the like, thereby enhancing operability and convenience.

To be more specific, character information moves from the upper edge portion 7a to the lower edge portion 7b of the liquid crystal monitor 7, and at the same time, the whole monitor is displayed with the image captured by the image capture lens 62. Further, by operating the operation buttons group 4, the character information can be also deleted. After that, the recording and reproducing device 1 captures image information by operating the operating portion of the shutter button 8b and the like which is provided downward the liquid crystal monitor 7 of the main surface portion 2a. The captured image information is used as an index to be displayed by a list in the liquid crystal monitor 7 when the audio information is reproduced, and the user can simply select and reproduce the audio information at the image capture time, and moreover, can confirm the situation of the speakers and the surrounding when the audio information is recorded.

Further, when the recording and reproducing device 1 has the unit main body 61 of the camera unit 6 rotated, according to this rotational angle, the rotation support mechanism 50 gives a click sense to the user, and at the same time, performs the operation mode change according to the rotational angle. To be more specific, the recording and reproducing device 1 performs the operation mode change according to each position with a hold on position located at a reference position (the rotational angle is 0 degree) in which the image capture lens 62 provided inside the unit main body 61 shown in FIGS. 13A and 14A is directed directly below the cover member 51, a hold off position located at a position (for example, the rotational angle is 24 degree) in which the image capture lens 62 shown in FIGS. 13B and 14B is rotated from the reference position, but does not appear from the opening support portion 96 of the cover member 51, a camera-on-position located at a position (for example, the rotational angle is 70 degree) in which the image capture lens 62 shown in FIGS. 13C and 14C is faced outside from the opening support portion 96 of the cover member 51, a home position located at a position (for example, the rotational angle is 95 degree) in which the image capture lens 72 shown in FIGS. 13D and 14D is directed approximately in front, a reversal position located at a position (for example, the rotational angle is 220 degree) in which the image capture lens 62 shown in FIGS. 13E and 14E is rotated to the operator side, and a stop position located at a position (for example, the rotational angle is 270 degree) which becomes a rotational limit of the unit main body 61 shown in FIGS. 13F and 14F.

The click plate 71 of the rotation support mechanism 50 rotated together with the unit main body 61, as described above, is provided with a plurality of click holes 82 to be climbed over by the protrusions 84 protruded in the plate spring 72, which is engaged with the fixed plated 73 and is regulated in rotation. This click hole 82 includes a first click hole 82a formed at a position with which the protrusion 84 of the plate spring 72 is engaged when the unit main body 61 is rotated to the hold on position as shown in FIG. 14A, a second click hole 82b formed at a position with which the protrusion 84 of the plate spring 72 is engaged when the unit main body 61 is rotated to the hold off position as shown in FIG. 14B, a third click hole 82c formed at a position with which the protrusion 84 of the plate spring 72 is engaged when the unit main body 61 is rotated to the home position as shown in FIG. 14D, and a fourth click hole 82d formed at a position with which the protrusion 84 of the plate spring 72 is engaged when the unit main body 61 is rotated to the stop position as shown in FIG. 14F.

The user can obtain a click sense by the engagement of the first to fourth click holes 82a to 82d with the protrusion 84, and can understand that the unit main body 61 is rotated to the hold on position, the hold off position, the home position, and the stop position.

Further, the click plate 71 has the first and second click holes 82a and 82b corresponding to the hold on position and the hold off position formed in diameter larger than the third and fourth click holes 82c and 82d corresponding to the home position and the stop position. As a result, when the unit main body 61 is rotated to the hold on position and the hold off position, the click plate 71 can give a great click sense comparing to the occasion when the unit main body 61 is rotated to the home position and the stop position, and this allows the user to recognize that the unit main body 61 is more definitely rotated to the hold on position and the hold off position.

Next, the change of the operation mode when the unit main body 61 is rotated to each position will be described. At the hold on position, the operation of the operation button group 4 of the device main body 2 is taken as invalid, and an operation error is prevented. Further, when the unit main body 61 is rotated to the hold on position at the recording or reproduction time, the recording or reproduction is continued. At the hold off position, from among the operation button group 4 of the device main body 2, other than the shutter button 8b is taken as valid, and the recording or reproduction of audio information can be performed. The image capture lens 62 is faced outside from the first opening portion 97 of the cover member 51 across from the camera position to the home position, and the image captured by the image capture lens 62 is displayed in the liquid crystal monitor 7, and at the same time, the operation of the whole group of operation button 4 including the shutter button 8b is taken as valid. Since across from the reverse position to the stop position, the image capture lens 62 is rotated to the operator side, the image displayed in the liquid crystal monitor 7 is prevented from being reversed and displayed upside down when seen from the operator.

Figure 15:
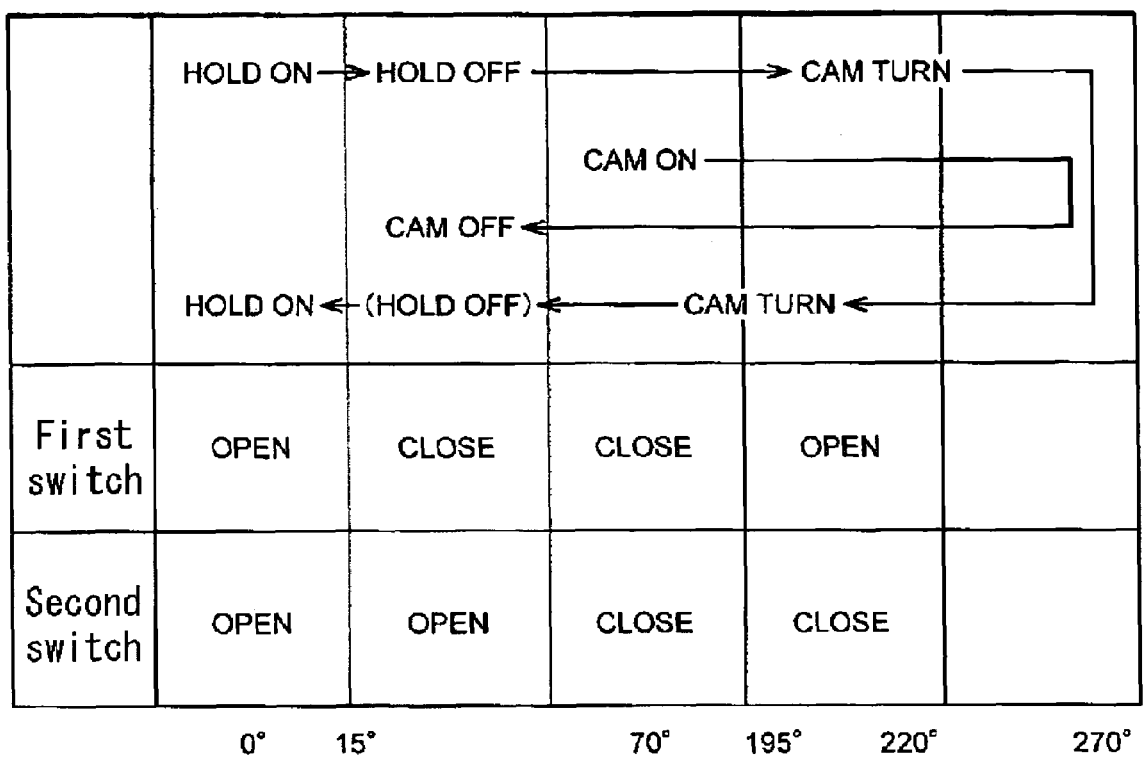
FIG. 15 is a view showing a relation between a pressed state of a first switch and a second switch and an operation mode.
Figure 16:
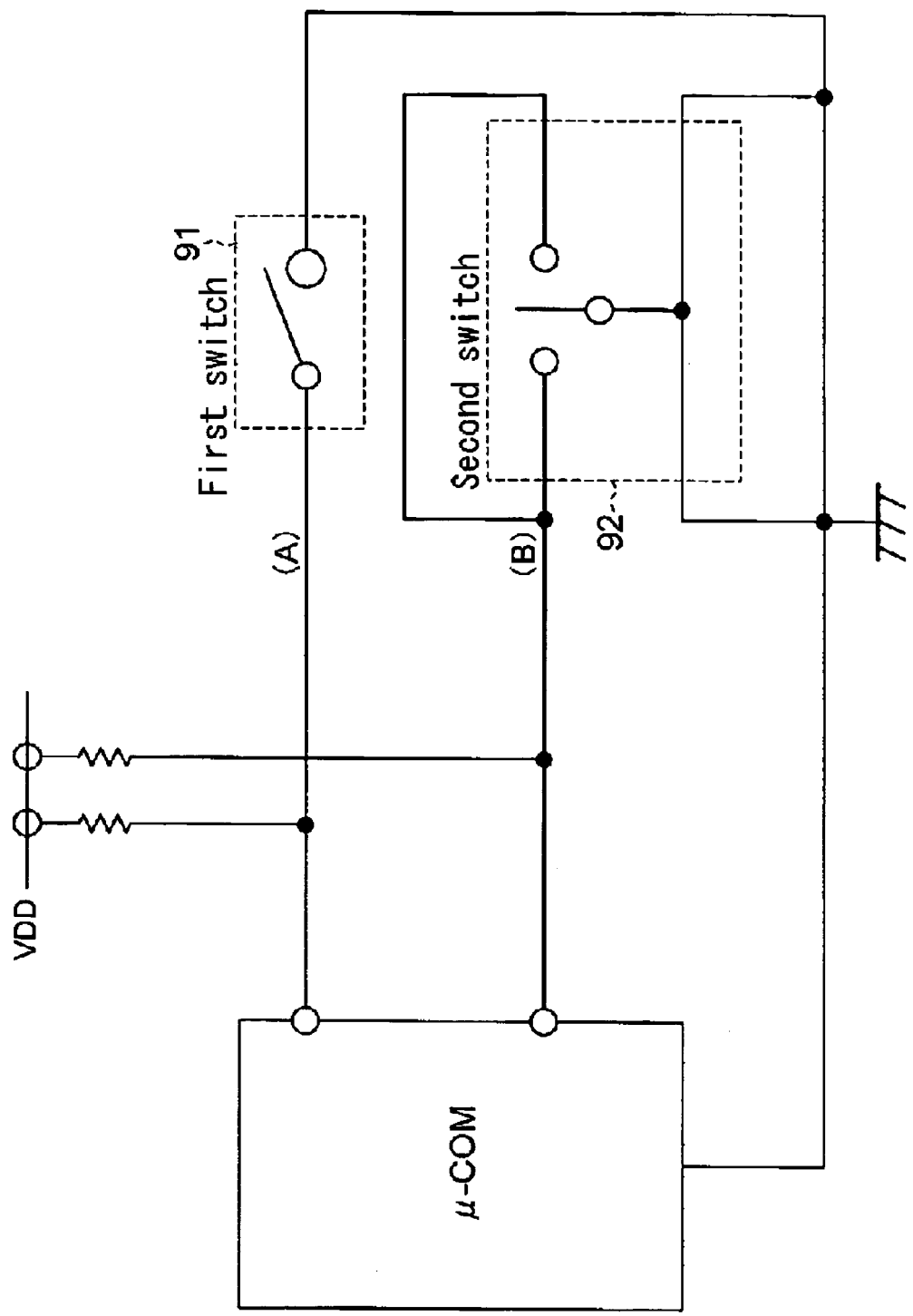
FIG. 16 is a circuit block diagram of a micro computer to detect the depressed state of the first switch and the second switch.

Such device main body 2 for giving such a click sense to the unit main body 61 and performing the conversion of the operation mode performs the pressing operation of the first and second switches 91 and 92 of the operation switch member 75, which is connected to the fixed plate 73 by the operation cam member 74 rotated together with the unit main body 61, and as shown in FIGS. 15 and 16, by detecting the pressed situation of the first and second switches 91 and 92 by a microcomputer, the operation mode is changed. To be more specific, as shown in FIGS. 17A and 18A, when the unit main body 61 is rotated to the hold on position, the detection switch member 75 is taken as OPEN since either of the first and second cams 89 and 90 of the operation cam member 74 does not abut against the first and second switches 91 and 92. The device main body 2 detects that the unit main body 61 is positioned at the hold on position and makes the operation of the operation button group 4 invalid since any one of the first and second switches 91 and 92 of the detection switch member 75 is OPEN.

Next, as shown in FIGS. 17B and 18B, when the unit main body 61 is rotated to the direction of the arrow mark R in the FIG. 13 and is positioned at the hold off position, the detection switch member 75 becomes CLOSE since the first cam 89 of the operation cam member 74 abuts against the first switch 91, and becomes OPEN since the second cam 90 does not abut against the second switch 92. The device main body 2 detects that the unit main body 61 is positioned at the hold off position since the first switch 91 of the detection switch member 75 is CLOSE, and the second switch 92 is OPEN, and makes the operation of the buttons other than the shutter button 8b of the operation button group 4 valid.

Next, as shown in FIGS. 17C, 17D, 18C and 18D, when the unit main body 61 is rotated in the direction of the arrow mark R in the FIG. 13, and is positioned at the area ranging from the camera-on-position to just before the reverse position, the first and second cams 89 and 90 of the operation cam member 74 are abutted against the first and second switches 91 and 92, and both of the switches become CLOSE. Since both of the first and second switches 91 and 92 of the detection switch member 75 become CLOSE, the device main body 2 detects that the unit main body 61 is rotated to the area ranging from the camera-on-position to just before the reverse position, and normal-rotation displays the image captured by the image capture lens 62 on the liquid crystal monitor 7, and at the same time, makes the operation of the whole operation button group 4 including the shutter button 8b valid.

Next, as shown in FIGS. 17E and 18E, when the unit main body 61 is rotated in the direction of the arrow mark R in the FIG. 13, and is positioned at the reverse position, the detection switch member 75 becomes OPEN since the first cam 89 of the operation cam member 74 is not abutted against the first switch 91, and becomes CLOSE since the second cam 90 is abutted against the second switch 92. Because the first switch 91 of the detection switch member 75 is OPEN, and the second switch 92 is CLOSE, the device main body 2 detects that the unit main body 61 is rotated to the reverse position, and prevents the image displayed in the liquid crystal monitor 7 from being reversed and displayed upside down when seen from the operator.

Next, as shown in FIGS. 17F and 18F, when the unit main body 61 is also rotated in the direction of the arrow mark R in the FIG. 13 and is positioned at the stop position, the detection switch member 75 is kept in an OPEN state since the first cam 89 of the operation cam member 74 is not abutted against the first switch 91, and is kept in a CLOSE state since the second cam 90 is abutted against the second switch 92. At this time, the protrusion 84 is engaged with the fourth click hole 82d, and at the same time, the rotation in the direction of the arrow mark R in FIG. 13 of the unit main body 61 is controlled by a stopper mechanism, the detail of which is omitted.

After that, when the unit main body 61 is rotated in the counter direction of the arrow mark R in FIG. 13, and is returned to the hold off position by crossing over the camera on position, at approximately 40 degree position from the hold on position, the operation of the camera unit 6 is stopped, and an image disappears from the liquid crystal monitor 7.

In this way, in the recording and reproducing device 1, in association with the rotational operation of the image capture lens 62 formed in the unit main body 61, the operation mode of the device main body 2 is changed, and therefore, erroneous operations of the operation mode change by the operator can be prevented. Further, since the operation mode is turned into the image capture mode of the device main body 2 suitable to the rotational angle of the unit main body 61, the operation of the unit main body 61 can be sensually operated.

An assembly step of such recording and reproducing device 1 will be described below. First, the movable chassis 54 of the movable block 3 is connected to the liquid crystal monitor 7 and the wiring board 55. Further, the cover member 51 is inserted with the unit main body 61 of the camera unit 6 from the first opening portion 97 side into the disposing portion 95, and then, the rotation support mechanism 50 is built inside from the second opening portion 98 side.

Further, the chassis 21 is slidably engaged with the sliding plate 30, and at the same time, this sliding plate 30 is mounted with the liquid crystal monitor 7. The liquid crystal monitor 7 is adhered with a cover glass 53. The movable chassis 54 is built with the liquid crystal monitor 7 connected to the sliding plate 30 which is engaged with the chassis 21, the liquid crystal protection cover 52, the wiring board 55, and the decoration plate 56, and then, is connected to the fixed plate 73 of the rotation support member 50 and the movable chassis 54.

Next, the chassis 21 slidably supporting the movable chassis 54 is connected to the main frame 14. The main frame 14 is connected to the wiring board group 13, which is mounted with a microphone and the like to be inputted with audio information in advance. After that, the main frame 14 is connected in such a manner as to be surrounded by the upper and lower halves 10 and 11 configuring the device main body 2 and by the armoring frame 12, thereby completing the recording and reproducing device 1.

Thus, the recording and reproducing device 1 is inserted with the unit main body 61 of the camera unit 6 in the disposing portion 95 from the first opening portion 97 side of the cover member 51, and then, is built with the rotation support member 50 from the second opening portion 98 side. In this way, the recording and reproducing device 1 is built with the unit main body 61 from the first opening portion 97 side, which is the top end side of the cover member 51 in which the opening support portion 96 smaller in diameter than the unit main body 61 is formed, and is designed to stop the slipping out of the unit main body 61 by the rotation support mechanism 50. Consequently, separately from the built-in step of the upper and lower halves 10 and 11, the device main body 2 can be built into the movable block 3, so that the camera unit 6 can be prevented from falling off and, at the same time, the degree of freedom for the manufacture and design can be increased, and convenience can be enhanced.

In the recording and reproducing device 1 adapted to an embodiment of the present invention, the rotational angles of the unit main body 61 of the camera unit 6 which are at the hold on position, the hold off position, the camera on position, the home position, the reverse position, and the stop position are just illustrative, and may be used by changing them suitably.

It should be understood by those skilled in the art that various modifications, combinations, sub-combinations and alterations may occur depending on design requirements and other factors insofar as they are within the scope of the appended claims or the equivalents thereof.

What is claimed is:

1. A recording and reproducing device comprising:
    a main body formed approximately in the shape of a rectangle;
    an input portion for receiving audio information;
    an output portion for outputting recorded audio information;
    an image capture portion for capturing image information, having an image capture lens and an image sensor;
    a rotation support member;
    a monitor for displaying information, slidably provided along the longitudinal direction of the main body; and
    a chassis including guide grooves formed along the longitudinal direction of the main body and slidably engaging the monitor, and an urging member for urging the monitor to one end of the longitudinal direction of the main body or to the other end according to the slide position of the monitor,
    wherein the rotation support member rotatably engages the image capture portion, detects a rotational angle of the image capture portion, and change the operation mode of the device according to the rotational angle,
    and wherein, when the monitor is slid to the inner side of the main body, a portion of the monitor faces outside the main body, and information is displayed in the portion facing outside, and when the monitor is slid outside the main body, the whole area of the monitor faces outside the main body, and information is displayed in the whole area.

* * * * *

UNITED STATES PATENT AND TRADEMARK OFFICE
CERTIFICATE OF CORRECTION

| | | |
|---|---|---|
| PATENT NO. | : 7,636,121 B2 | Page 1 of 1 |
| APPLICATION NO. | : 11/205040 | |
| DATED | : December 22, 2009 | |
| INVENTOR(S) | : Ryota Matsumoto et al. | |

It is certified that error appears in the above-identified patent and that said Letters Patent is hereby corrected as shown below:

On the title page:
Item 57, line 3, "display" should read --displayed--.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,636,121 B2 Page 1 of 1
APPLICATION NO. : 11/205040
DATED : December 22, 2009
INVENTOR(S) : Matsumoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1160 days.

Signed and Sealed this

Ninth Day of November, 2010

David J. Kappos
*Director of the United States Patent and Trademark Office*